United States Patent
Hu et al.

(10) Patent No.: US 12,477,329 B2
(45) Date of Patent: Nov. 18, 2025

(54) COMMUNICATION METHOD AND APPARATUS

(71) Applicant: Huawei Technologies Co., Ltd., Shenzhen (CN)

(72) Inventors: Li Hu, Shanghai (CN); Rong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 17/852,858

(22) Filed: Jun. 29, 2022

(65) Prior Publication Data

US 2022/0353680 A1 Nov. 3, 2022

Related U.S. Application Data

(63) Continuation of application No. PCT/CN2019/130977, filed on Dec. 31, 2019.

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0892* (2013.01); *H04W 76/10* (2018.02); *H04W 80/10* (2013.01)

(58) Field of Classification Search
CPC ..... H04W 12/06; H04W 76/10; H04W 80/10; H04L 63/0892
See application file for complete search history.

(56) References Cited

U.S. PATENT DOCUMENTS 9,215,228 B1   12/2015  Zhang et al.
12,224,899 B2 *  2/2025  Sung ............... H04W 60/04
(Continued)

FOREIGN PATENT DOCUMENTS

CN   102077652 A   5/2011
CN   103813303 A   5/2014
(Continued)

OTHER PUBLICATIONS

J. Cao et al., "A Survey on Security Aspects for 3GPP 5G Networks," in IEEE Communications Surveys & Tutorials, vol. 22, No. 1, pp. 170-195, Firstquarter 2020, doi: 10.1109/COMST.2019.2951818. Date of Publication: Nov. 8, 2019 (Year: 2019).*

(Continued)

*Primary Examiner* — Harris C Wang
(74) *Attorney, Agent, or Firm* — Slater Matsil, LLP

(57) ABSTRACT

This application provides a communication method and apparatus. The method includes: a terminal sending first network information of a second network to a first network, where the first network information includes first indication information of the second network, and the first indication information indicating that the terminal requests to access the second network. The terminal performs onboarding delivery authentication of the second network through the first network. After onboarding delivery authentication of the second network succeeds, the terminal receives configuration information of the first network through the first network, and obtains a credential of the second network through the first network from an online sign-up server in the second network.

17 Claims, 10 Drawing Sheets

(51) Int. Cl.
    *H04W 76/10*     (2018.01)
    *H04W 80/10*     (2009.01)

(56) References Cited

U.S. PATENT DOCUMENTS

| | | | | |
|---|---|---|---|---|
| 12,245,134 | B2* | 3/2025 | Starsinic | H04W 48/12 |
| 12,348,958 | B2* | 7/2025 | Kweon | H04W 8/20 |
| 2012/0275401 | A1 | 11/2012 | Sun | |
| 2015/0264051 | A1 | 9/2015 | Hoggan | |
| 2019/0029065 | A1 | 1/2019 | Park et al. | |
| 2019/0174449 | A1 | 6/2019 | Shan et al. | |
| 2020/0329422 | A1* | 10/2020 | Sirotkin | H04W 48/18 |
| 2021/0058784 | A1* | 2/2021 | Kedalagudde | H04W 76/12 |
| 2021/0092707 | A1* | 3/2021 | Ryu | H04W 84/045 |
| 2021/0410001 | A1* | 12/2021 | Shi | H04W 28/0263 |
| 2022/0330022 | A1* | 10/2022 | Kolekar | H04W 12/069 |
| 2022/0353680 | A1* | 11/2022 | Hu | H04W 12/069 |
| 2023/0189187 | A1* | 6/2023 | Velev | H04W 48/16 |
| | | | | 455/435.1 |
| 2024/0080321 | A1* | 3/2024 | Peng | H04L 63/123 |

FOREIGN PATENT DOCUMENTS

| | | |
|---|---|---|
| CN | 108377493 A | 8/2018 |
| CN | 109996345 A | 7/2019 |
| CN | 110475280 A | 11/2019 |
| EP | 3720203 A1 | 10/2020 |
| KR | 20180097113 A | 8/2018 |
| WO | 2010121433 A1 | 10/2010 |

OTHER PUBLICATIONS

Ericsson, "Solution for UE Onboarding and provisioning for an SNPN", SA WG2 Meeting #S2-136, S2-1911788, Nov. 18-24, 2019, 4 Pages, Reno, Nevada, US.

Huawei, et al., "New Solution UE onboarding and provisioning for NPN", SA WG2 Meeting #136, S2-1911668, (revision of S2-191xxxx), Nov. 18-22, 2019, 7 Pages, Reno, NV, USA.

Intel, "Solution for UE onboarding in non-public networks", 3GPP SA WG2 Meeting #136, S2-1911356, Nov. 18-22, 2019, 2 Pages, Reno, USA.

OPPO, "Solution for remote provisioning with PLMN subscription", SA WG2 Meeting #136, S2-1911147, Nov. 18-22, 2019, 2 Pages, Reno, USA.

Samsung, "Solution for UE onboarding and remote provisioning", SA WG2 Meeting #136, S2-1911517, (revision of S2-191xxxx), Nov. 18-22, 2019, 3 Pages, Reno, NV, USA.

"3rd Generation Partnership Project; Technical Specification Group Services and System Aspects; Study on the security aspects of the next generation system (Release 14)", 3GPP TR 33.899, V1.0.0, Technical Report, Mar. 2017, 471 Pages.

3rd Generation Partnership Project;Technical Specification Group Services and System Aspects;Security architecture and procedures for 5G system(Release 15),3GPP TS 33.501 V15.7.0 (Dec. 2019),total:191pages.

3rd Generation Partnership Project;Technical Specification Group Services and System Aspects;Procedures for the 5G System (5GS);Stage 2(Release 15),3GPP TS 23.502 V15.8.0 (Dec. 2019),total:230pages.

3rd Generation Partnership Project;Technical Specification Group Services and System Aspects;System architecture for the 5G System (5GS);Stage 2(Release 16),3GPP TS 23.501 V16.3.0 (Dec. 2019),total:417pages.

* cited by examiner

COMMUNICATION METHOD AND APPARATUS

CROSS-REFERENCE TO RELATED APPLICATIONS

This application is a continuation of International Application No. PCT/CN2019/130977, filed on Dec. 31, 2019, the disclosure of which is hereby incorporated by reference in its entirety.

TECHNICAL FIELD

This application relates to the field of wireless communication technologies, and in particular, to a communication method and apparatus.

BACKGROUND

A public network integrated non-public network (Public Network Integrated Non-Public Network, PNI-NPN) refers to a non-public network (NPN, private network for short) in which some network resources (for example, RAN resources and core network resources) provided by an operator of a public network (PLMN, public network for short) can be used by a third-party manufacturer (for example, an enterprise or a factory). The non-public network may obtain independent and isolated resources. For example, the access network resources are obtained through division in a closed access group (CAG) cell mechanism, and the core network resources are distinguished based on a slicing mechanism, a dedicated data network name (DNN) mechanism, or the like.

In a PNI-NPN scenario, there are three entities: a terminal (for example, a Volkswagen employee having a mobile subscriber identity module (SIM) card, where a private network application of Volkswagen is also on the terminal), a public network (for example, corresponding to an operator: China Mobile), and a private network (for example, corresponding to a vehicle enterprise: Volkswagen). Volkswagen expects the Volkswagen employee to obtain independent and isolated resources of the private network when the employee uses the private network application. For example, a public network user cannot access a CAG cell, and only the Volkswagen employee can access the CAG cell. Therefore, the CAG cell has a better signal strength. The public network user cannot access a data network of Volkswagen, and only the Volkswagen employee can access the data network. Therefore, the data network has a higher security level.

In the conventional technology, a terminal needs to access a private network based on information that has been obtained by the terminal and that is related to accessing the private network. However, it is possible that the terminal does not obtain, before accessing the private network, the information related to accessing the private network. For example, when a new Volkswagen employee gets on board, the employee has only a USIM card of the operator: China Mobile. In this case, a terminal of the employee does not have any information related to the private network of Volkswagen, for example, an authentication credential, and the employee cannot access the private network of Volkswagen. However, there is no corresponding solution in the conventional technology.

SUMMARY

Embodiments of this application provide a communication method and apparatus, to resolve a problem that a terminal cannot access a private network due to lack of related information.

According to a first aspect, this application provides a communication method, including:

A terminal sends first network information of a second network to a first network, where the first network information includes first indication information of the second network, and the first indication information indicates that the terminal requests to access the second network.

The terminal performs onboarding delivery authentication of the second network through the first network.

After onboarding delivery authentication of the second network succeeds, the terminal receives configuration information of the first network through the first network, and obtains a credential of the second network through the first network from an online sign-up server in the second network.

In a possible implementation, the first network information may further include an onboarding request indication, indicating a control plane network element in the first network to initiate onboarding delivery authentication.

In a possible implementation, the method further includes:

The terminal obtains second network information of the second network from a broadcast message of an access network, and obtains the first network information based on the second network information; the terminal obtains a network identifier of the second network from a broadcast message of an access network, obtains second network information of the second network from a path information mapping network element based on the network identifier of the second network, and obtains the first network information based on the second network information; or the terminal obtains second network information of the second network from an application server in the second network, and obtains the first network information based on the second network information.

In a possible implementation, the method further includes: The terminal accesses the second network based on the configuration information of the first network and the credential of the second network.

In a possible implementation, the method further includes: The terminal receives a temporary indication returned by the first network, and starts a timer based on the temporary indication. After the timer expires, the terminal performs the accessing the second network based on the obtained configuration information of the first network and the obtained credential of the second network.

In a possible implementation, the configuration information of the first network includes an access and mobility management related parameter and a session management policy, and the access and mobility management related parameter and the session management policy are obtained by the first network based on first onboarding information of the second network.

In a possible implementation, that the terminal obtains a credential of the second network through the first network from an online sign-up server in the second network includes: The terminal obtains an address of the online sign-up server, and obtains the credential of the second network from the online sign-up server based on a first session and the address of the online sign-up server, where the first session is a session established between the terminal and the first network.

In a possible implementation, that the terminal obtains an address of the online sign-up server includes: The terminal obtains the address of the online sign-up server from the second network information; or the terminal receives the address of the online sign-up server returned by the first network.

The first network is a public network, and the second network is a non-public network.

According to a second aspect, this application provides a communication method, including:

A control plane network element in a first network receives first network information of a terminal, where the first network information includes first indication information of a second network, and the first indication information indicates that the terminal requests to access the second network. The control plane network element determines, based on the first network information of the terminal, that onboarding delivery authentication of the second network needs to be performed on the terminal, and triggers onboarding delivery authentication of the second network. After onboarding delivery authentication of the second network succeeds, the control plane network element sends a repository function network element in the first network a third message, used to trigger the repository function network element to update user subscription data of the terminal, where the message includes a terminal identifier and second indication information of the second network.

In a possible implementation, the control plane network element sends a second message to the terminal, where the second message includes one or more of a temporary indication and an address of an online sign-up server.

In a possible implementation, the second indication information is obtained by the control plane network element based on the first indication information.

In a possible implementation, the second indication information is the same as the first indication information.

In a possible implementation, the control plane network element obtains an address of an online sign-up authentication device based on the first indication information of the second network, and sends the online sign-up authentication device a first message, used to trigger onboarding delivery authentication of the second network.

In a possible implementation, the control plane network element obtains, based on the first indication information of the second network, the address of the online sign-up server corresponding to the second network.

In a possible implementation, that the control plane network element determines, based on the first network information of the terminal, that onboarding delivery authentication of the second network needs to be performed on the terminal includes:

The control plane network element searches for second onboarding information of the second network based on the first network information, and determines, based on the second onboarding information of the second network, that onboarding delivery authentication of the second network needs to be performed on the terminal; or the control plane network element determines, based on an onboarding request indication included in the first network information, that onboarding delivery authentication of the second network needs to be performed on the terminal.

The first network is a public network, and the second network is a non-public network.

According to a third aspect, this application provides a communication method, including:

A repository function network element in a first network receives, from a control plane network element in the first network, a third message, used to trigger to update user subscription data of a terminal in the first network, where the third message carries a terminal identifier and second indication information of a second network.

The repository function network element obtains, based on the second indication information of the second network, first subscription data corresponding to the second network.

The repository function network element updates the user subscription data of the terminal based on the first subscription data of the second network.

In a possible implementation, the repository function network element updates configuration information on the terminal.

In a possible implementation, the configuration information includes a session management policy, and that the repository function network element updates configuration information on the terminal includes: The repository function network element sends a policy control network element a subscription data change notification, to trigger the policy control network element to update the session management policy that is on the terminal.

In a possible implementation, the configuration information includes an access and mobility management related parameter, and that the repository function network element updates configuration information on the terminal includes: The repository function network element obtains the access and mobility management related parameter based on first onboarding information of the second network, and sends the access and mobility management related parameter to the terminal.

In a possible implementation, the first subscription data of the second network includes a data network name DNN.

In a possible implementation, the first subscription data of the second network may further include one or more of network slice selection assistance information NSSAI, a closed access group identifier CAG ID, a slice identifier privacy indication, a secondary authentication execution indication, a slice authentication execution indication, and a user plane protection policy.

The first network is a public network, and the second network is a non-public network.

According to a fourth aspect, this application provides a communication method, including:

A terminal sends first network information of a second network to a first network, where the first network information includes first indication information of the second network, and the first indication information indicates that the terminal requests to access the second network.

The terminal performs onboarding delivery authentication of the second network through the first network.

After onboarding delivery authentication of the second network fails, the terminal selects first network information of a third network, and sends the first network information of the third network to the first network.

According to a fifth aspect, an embodiment of this application provides a communication apparatus. The apparatus has a function of implementing the terminal in any one of the first aspect or the possible implementations of the first aspect, a function of implementing the control plane network element in any one of the second aspect or the possible implementations of the second aspect, a function of implementing the repository function network element in any one of the third aspect or the possible implementations of the third aspect, or a function of implementing the terminal in any one of the fourth aspect or the possible implementations of the fourth aspect.

The apparatus may be a terminal, or may be a chip included in the terminal. The function of the communication device may be implemented by hardware, or may be implemented by hardware by executing corresponding software. The hardware or the software includes one or more modules corresponding to the function.

The apparatus may be a network device, or may be a chip included in the network device. The function of the communication device may be implemented by hardware, or may be implemented by hardware by executing corresponding software. The hardware or the software includes one or more modules corresponding to the function.

In a possible design, a structure of the apparatus includes a processing module and a transceiver module. The processing module is configured to support the apparatus in performing the method in any one of the first aspect or the possible implementations of the first aspect, perform the method in any one of the second aspect or the possible implementations of the second aspect, perform the method in any one of the third aspect or the possible implementations of the third aspect, or perform the method in any one of the fourth aspect or the possible implementations of the fourth aspect. The transceiver module is configured to support communication between the apparatus and another communication device.

In another possible design, a structure of the apparatus includes a processor, and may further include a memory. The processor is coupled to the memory, and may be configured to execute computer program instructions stored in the memory, so that the apparatus performs the method in any one of the first aspect or the possible implementations of the first aspect, performs the method in any one of the second aspect or the possible implementations of the second aspect, performs the method in any one of the third aspect or the possible implementations of the third aspect, or performs the method in any one of the fourth aspect or the possible implementations of the fourth aspect. Optionally, the apparatus further includes a communication interface, and the processor is coupled to the communication interface. When the apparatus is the network device, the communication interface may be a transceiver or an input/output interface. When the apparatus is the chip included in the network device, the communication interface may be an input/output interface of the chip. Optionally, the transceiver may be a transceiver circuit, and the input/output interface may be an input/output circuit.

According to a sixth aspect, an embodiment of this application provides a chip system, including: a processor, where the processor is coupled to a memory. The memory is configured to store a program or instructions, and when the program or the instructions are executed by the processor, the chip system is enabled to implement the method in any one of the first aspect or the possible implementations of the first aspect, perform the method in any one of the second aspect or the possible implementations of the second aspect, perform the method in any one of the third aspect or the possible implementations of the third aspect, or perform the method in any one of the fourth aspect or the possible implementations of the fourth aspect.

Optionally, the chip system further includes an interface circuit, and the interface circuit is configured to exchange code instructions with the processor.

Optionally, there may be one or more processors in the chip system, and the processor may be implemented by hardware or may be implemented by software. When the processor is implemented by the hardware, the processor may be a logic circuit, an integrated circuit, or the like. When the processor is implemented by the software, the processor may be a general-purpose processor, and is implemented by reading software codes stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated on a same chip, or may be separately disposed on different chips. A type of the memory and a manner of disposing the memory and the processor are not specifically limited in this application.

According to a seventh aspect, an embodiment of this application provides a computer-readable storage medium. The computer-readable storage medium stores a computer program or instructions, and when the computer program or the instructions are executed, a computer is enabled to perform the method in any one of the first aspect or the possible implementations of the first aspect, perform the method in any one of the second aspect or the possible implementations of the second aspect, perform the method in any one of the third aspect or the possible implementations of the third aspect, or perform the method in any one of the fourth aspect or the possible implementations of the fourth aspect.

According to an eighth aspect, an embodiment of this application provides a computer program product. When a computer reads and executes the computer program product, the computer is enabled to perform the method in any one of the first aspect or the possible implementations of the first aspect, perform the method in any one of the second aspect or the possible implementations of the second aspect, perform the method in any one of the third aspect or the possible implementations of the third aspect, or perform the method in any one of the fourth aspect or the possible implementations of the fourth aspect.

According to a ninth aspect, an embodiment of this application provides a communication system. The communication system includes the foregoing control plane network element and repository network element. Optionally, the communication system may further include another network device and/or terminal.

DETAILED DESCRIPTION OF ILLUSTRATIVE EMBODIMENTS

To make objectives, technical solutions, and advantages of embodiments of this application clearer, the following further describes embodiments of this application in detail with reference to the accompanying drawings.

A communication method provided in embodiments of this application is applicable to a plurality of system architectures. The network architecture and the service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

Figure 1:
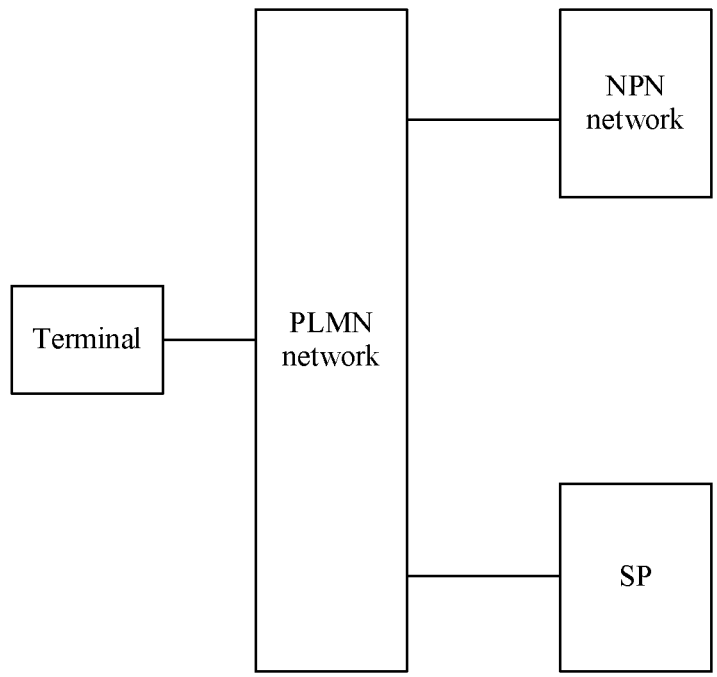
FIG. 1 is a schematic diagram of a network architecture of a communication system to which an embodiment of this application is applicable.

FIG. 1 is a schematic diagram of a possible network architecture to which an embodiment of this application is applicable. The PNI-NPN network architecture includes a terminal, a public network, an online sign-up service provider (SP), and a private network.

The terminal is a device that has a wireless transceiver function, and may be deployed on the land, including an indoor or outdoor device, a hand-held device, a wearable device, or a vehicle-mounted device, or may be deployed on the water (for example, on a ship), or may be deployed in the air (for example, on a plane, a balloon, or a satellite). The terminal may communicate with a core network through a radio access network (RAN), and exchange voice and/or data with the RAN. The terminal may be a mobile phone, a tablet computer (Pad), a computer with a wireless transceiver function, a mobile internet device (MID), a wearable device, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in embodiments of this application. The terminal may also be sometimes referred to as a terminal device, user equipment, a mobile station, a remote station, or the like. A specific technology, a device form, and a name that are used by the terminal are not limited in embodiments of this application. In this application, the terminal may be a terminal with a screen, or may be a terminal without a screen. The terminal with a screen represents that a user may manipulate the terminal in a manner of, for example, using an APP. The terminal without a screen represents that a user can perform limited manipulation on the terminal, and can perform simple control and status observation only in a manner of, for example, using a button or an indicator.

A PLMN network is a network deployed for operation, and specifically includes network elements such as an access network device, an access management network element, a session management network element, a user plane network element, a policy control network element, an authentication service function network element, a unified data management network element, a unified data repository network element, and a network exposure network element. The PLMN network may further include another network element. This is not limited in embodiments of this application.

(1) The access network device is a device that is in a network and that is configured to connect a terminal to a wireless network. The access network device may be a node in the radio access network, and may also be referred to as a base station, or may also be referred to as a radio access network (RAN) node (or device). A network device may include an evolved NodeB (NodeB, eNB, or e-NodeB, evolved NodeB) in a long term evolution (LTE) system or an LTE-advanced (LTE-A) system, for example, a conventional macro base station eNB and a micro base station eNB in a heterogeneous network scenario, or may include a next generation NodeB (gNB) in a 5th generation (5G) mobile communication technology new radio (NR) system, or may further include a radio network controller (RNC), a NodeB (NB), a base station controller (BSC), a base transceiver station (BTS), a transmission reception point (TRP), a home base station (for example, a home evolved NodeB or a home NodeB, HNB), a baseband unit (BBU), a baseband pool BBU pool, a Wi-Fi access point (AP), or the like, or may further include a centralized unit (CU) and a distributed unit (DU) in a cloud access network (CloudRAN) system. This is not limited in embodiments of this application. In a split deployment scenario in which the access network device includes the CU and the DU, the CU supports protocols such as a radio resource control (RRC) protocol, a packet data convergence protocol (PDCP), and a service data adaptation protocol (SDAP), and the DU mainly supports a radio link control (RLC) layer protocol, a media access control (MAC) layer protocol, and a physical layer protocol.

(2) The access management network element is mainly used for attachment, mobility management, and a tracking area update procedure of a terminal in a mobile network. The access management network element terminates a non-access stratum (NAS) message, completes registration management, connection management, reachability management, allocates a tracking area list (TA list), completes mobility management and the like, and transparently routes a session management (SM) message to the session management network element. In a 5th generation (5G) communication system, the access management network element may be an access and mobility management function (AMF). In a future communication system (for example, a 6G communication system), the mobility management network element may still be an AMF network element, or may have another name. This is not limited in this application.

(3) The session management network element is mainly used for session management in the mobile network, such as session establishment, modification, and release. A specific function is, for example, allocating an internet protocol (IP) address to the terminal, or selecting a user plane network element that provides a packet forwarding function. In the 5G communication system, the session management network element may be a session management function (SMF). In the future communication system (for example, the 6G communication system), the session management network element may still be an SMF network element, or may have another name. This is not limited in this application.

(4) The user plane network element is mainly used for processing a user packet. The processing is, for example, forwarding, charging, or lawful interception. The user plane network element may also be referred to as a protocol data unit (PDU) session anchor (PSA). In the 5G communication system, the user plane network element may be a user plane function (UPF). In the future communication system (for example, the 6G communication system), the user plane network element may still be a UPF network element, or may have another name. This is not limited in this application.

(5) The policy control network element has a user subscription data management function, a policy control function, a charging policy control function, quality of service (QoS) control, and the like. In the 5G communication system, the policy control network element may be a policy control function (PCF). In the future communication system (for example, the 6G communication system), the policy control network element may still be a PCF network element, or may have another name. This is not limited in this application.

(6) The authentication service function network element is mainly configured to perform security authentication on the terminal. In the 5G communication system, the authentication service function network element may be an authentication server function (AUSF). In the future communication system (for example, the 6G communication system), the authentication service function network element may still be an AUSF network element, or may have another name. This is not limited in this application.

(7) The data management network element is mainly configured to manage user subscription data of the terminal. In the 5G communication system, the unified data management network element may be unified data management (UDM). In the future communication system (for example, the 6G communication system), the unified data management network element may still be a UDM network element, or may have another name. This is not limited in this application.

(8) The data repository network element is mainly configured to store structured data information, including user subscription data, policy information, and network data or service data defined in a standard format. In the 5G communication system, the unified data repository network element may be a unified data repository (UDR). In the future communication system (for example, the 6G communication system), the unified data repository network element may still be a UDR network element, or may have another name. This is not limited in this application.

(9) The network exposure network element may expose some functions of the network to an application in a controlled manner. In the 5G communication system, the network exposure network element may be a network exposure function (NEF). In the future communication system (for example, the 6G communication system), the network exposure network element may still be an NEF network element, or may have another name. This is not limited in this application.

In the PNI-NPN architecture, the private network is enabled by the public network, for example, obtains a public network resource in a manner of using a dedicated DNN, a dedicated slice, a CAG, or the like. For example, in the manner of using the dedicated DNN, the private network may obtain a dedicated user plane resource (for example, obtain a UPF resource that can be accessed only by a private network device). In the manner of using the dedicated slice, the private network may obtain a dedicated control plane resource (for example, obtain an AMF resource or an SMF resource that can be accessed only by the private network device). In the manner of using the CAG, the private network may obtain a dedicated access network resource (for example, obtain a cell that can be accessed only by the private network device, for example, a CAG cell).

The private network may include a private network server (NPN Server) and a private network authentication device (Non-Public Network Authentication, Authorization, and Accounting, NPN AAA). The private network server is configured to provide a private network service for a terminal in the private network, and the private network authentication device is configured to determine whether the terminal is allowed to access the private network. The private network server and the private network authentication device may be integrated, or may be two independent devices. This is not limited in this application.

In the PNI-NPN architecture, to access a private network through a public network, one terminal needs to have configuration information of the public network and credential information for accessing the private network. In addition, to determine whether the terminal accesses the private network through the public network, the public network needs to have onboarding information of the terminal. In addition, how the private network determines whether the terminal is allowed to access the private network requires the private network to have credential information of the terminal. To complete the configuration, the online sign-up service provider needs to be introduced.

The online sign-up service provider (SP) may include an online sign-up server (OSU server) and an online sign-up authentication device (OSU AAA server). The online sign-up server is configured to generate, in an online onboarding process, subscription data provided by the private network for the terminal, and the online sign-up authentication device is configured to authenticate the terminal in the online onboarding process. The online sign-up server and the online sign-up authentication device may be integrated, or may be two independent devices. This is not limited in this application.

If the SP is independent of the other three roles, an NPN has an agreement with the SP, and the NPN requires the SP to perform a registration operation for the NPN; the SP also has an agreement with the PLMN, and the SP requires the PLMN to provide a registration operation for the SP. In this case, an OSU and the NPN belong to different DNNs. OSU AAA may be deployed on a user plane through an N6 interface or deployed on a control plane through an Naf interface. Alternatively, the OSU AAA may directly be integrated with the OSU. If the SP also belongs to the NPN, the NPN directly has an agreement with the PLMN, and the NPN requires the PLMN to perform a registration operation for the NPN. In this case, an OSU and the NPN belong to a same DNN. OSU AAA may be deployed on a user plane through an N6 interface or deployed on a control plane through an Naf interface. Alternatively, the OSU AAA may directly be integrated with the OSU or the NPN AAA.

It may be understood that the foregoing network elements or functions may be network elements in a hardware device, may be software functions running on dedicated hardware, or may be virtualized functions instantiated on a platform (for example, a cloud platform). One or more services may be obtained through division based on the foregoing functions. Further, a service independent of a network function may exist. In this application, instances of the functions, instances of services included in the functions, or instances of services that exist independently of network functions may be referred to as service instances.

Figure 2:
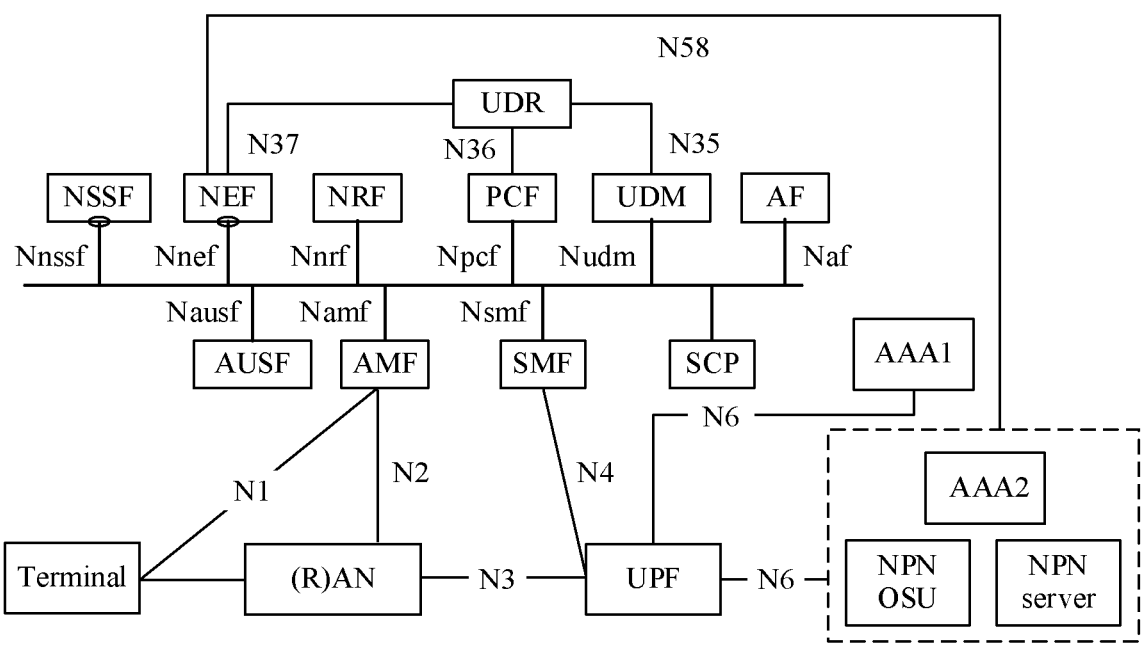
FIG. 2 is a schematic diagram of a 5G network architecture to which an embodiment of this application is applicable.

FIG. 2 is a schematic diagram of a specific possible network architecture to which an embodiment of this application is applicable, and a 5G communication system is used as an example. The network architecture includes a terminal, a RAN, an AMF, an SMF, a UPF, a PCF, UDM, an NEF, a UDR, OSU AAA, NPN AAA, an OSU server, an NPN server, and the like. Network elements such as the AMF, the SMF, the UDM, the UDR, and the PCF may interact with each other through a service-oriented interface. For example, a service-oriented interface externally provided by the AMF is Namf, a service-oriented interface externally provided by the SMF is Nsmf, a service-oriented interface externally provided by the UDM is Nudm, a service-oriented interface externally provided by the UDR is Nudr, and a service-oriented interface externally provided by the PCF is Npcf. In FIG. 2, an N1 interface is a reference point between the UE and the AMF; an N2 interface is a reference point between the RAN and the AMF, and is used to send a non-access stratum (NAS) message and a next generation application protocol (NGAP) message, and the like; an N3 interface is a reference point between the RAN and the UPF, and is used to transmit user plane data and the like; an N4 interface is a reference point between the SMF and the UPF, and is used to transmit information such as tunnel identifier information of an N3 connection, data buffering indication information, and a downlink data notification message; an N6 interface is a reference point between the UPF and a DN, and is used to transmit user plane data and the like.

For ease of description, subsequently, this application is described by using an example in which the access management network element is an AMF network element, the session management network element is an SMF network element, the authentication service function network element is an AUSF network element, the unified data repository network element is a UDR network element, the unified data management network element is a UDM network element, and the policy control network element is a PCF network element. Further, the AMF network element is referred to as an AMF for short, the SMF network element is referred to as an SMF for short, the AUSF network element is referred to as an AUSF for short, the UDR network element is referred to as a UDR for short, the UDM network element is referred to as UDM for short, and the PCF network element is referred to as a PCF for short. To be specific, in subsequent descriptions in this application, the AMF may be replaced with the access management network element, the SMF may be replaced with the session management network element, the AUSF may be replaced with the authentication service function network element, the UDR may be replaced with the unified data repository network element, the UDM may be replaced with the unified data management network element, and the PCF may be replaced with the policy control network element.

It should be noted that the terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of the description such as "at least one type" is similar. The term "and/or" describes an association relationship for describing associated objects and represents that three relationships may exist. For example, A and/or B may represent the following three cases: Only A exists, both A and B exist, and only B exists. In addition, the character "/", unless otherwise specified, usually indicates an "or" relationship between the associated objects.

Unless otherwise stated, ordinal numbers such as "first" and "second" in embodiments of this application are used to distinguish between a plurality of objects, but are not intended to limit a sequence, a time sequence, priorities, or importance of the plurality of objects. In addition, descriptions of "first" and "second" do not necessarily indicate that objects are different.

Figure 3A:
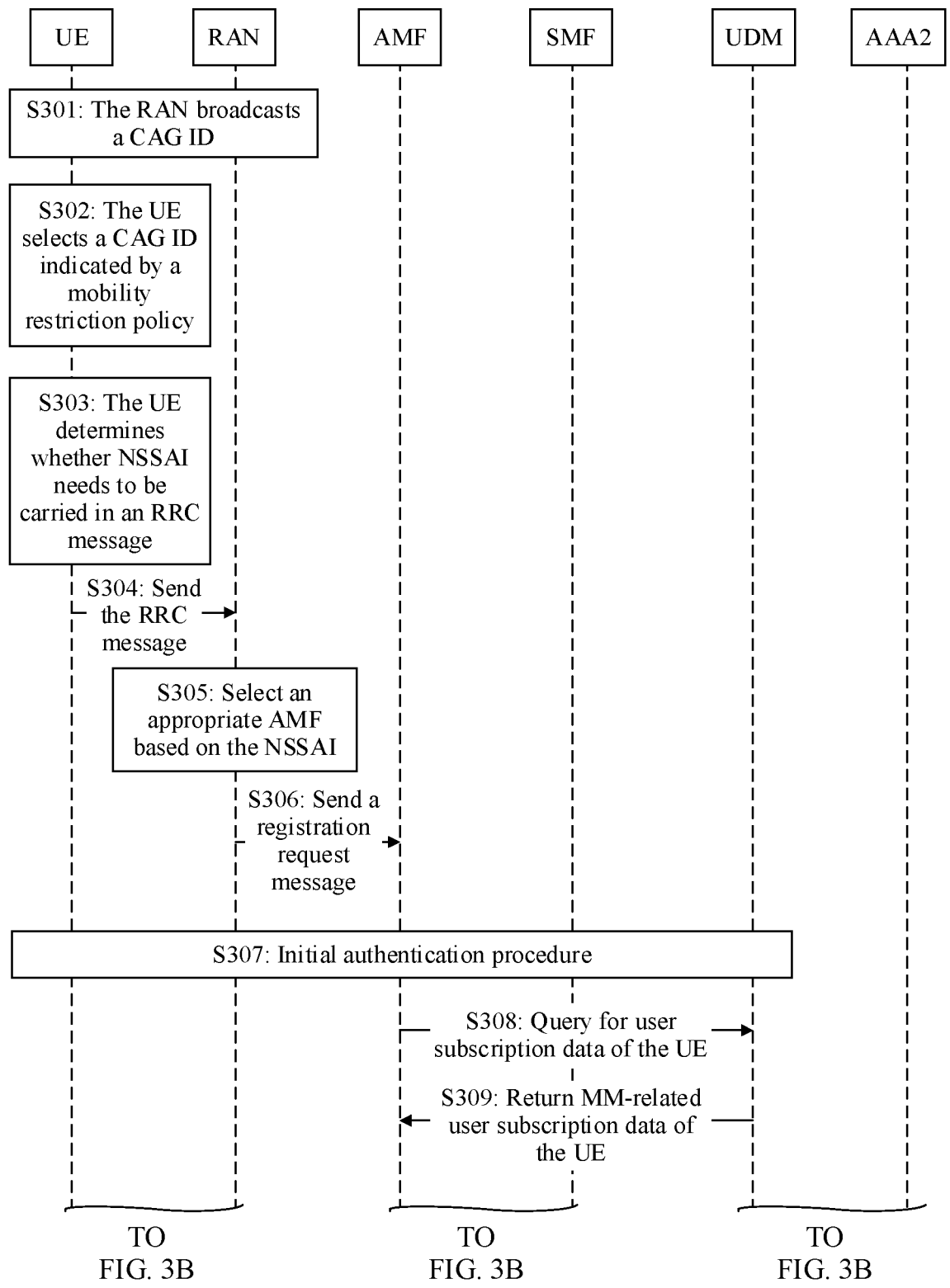
FIG. 3A and FIG. 3B are a schematic communication diagram of a method for accessing a private network by a terminal in the conventional technology.
Figure 3B:
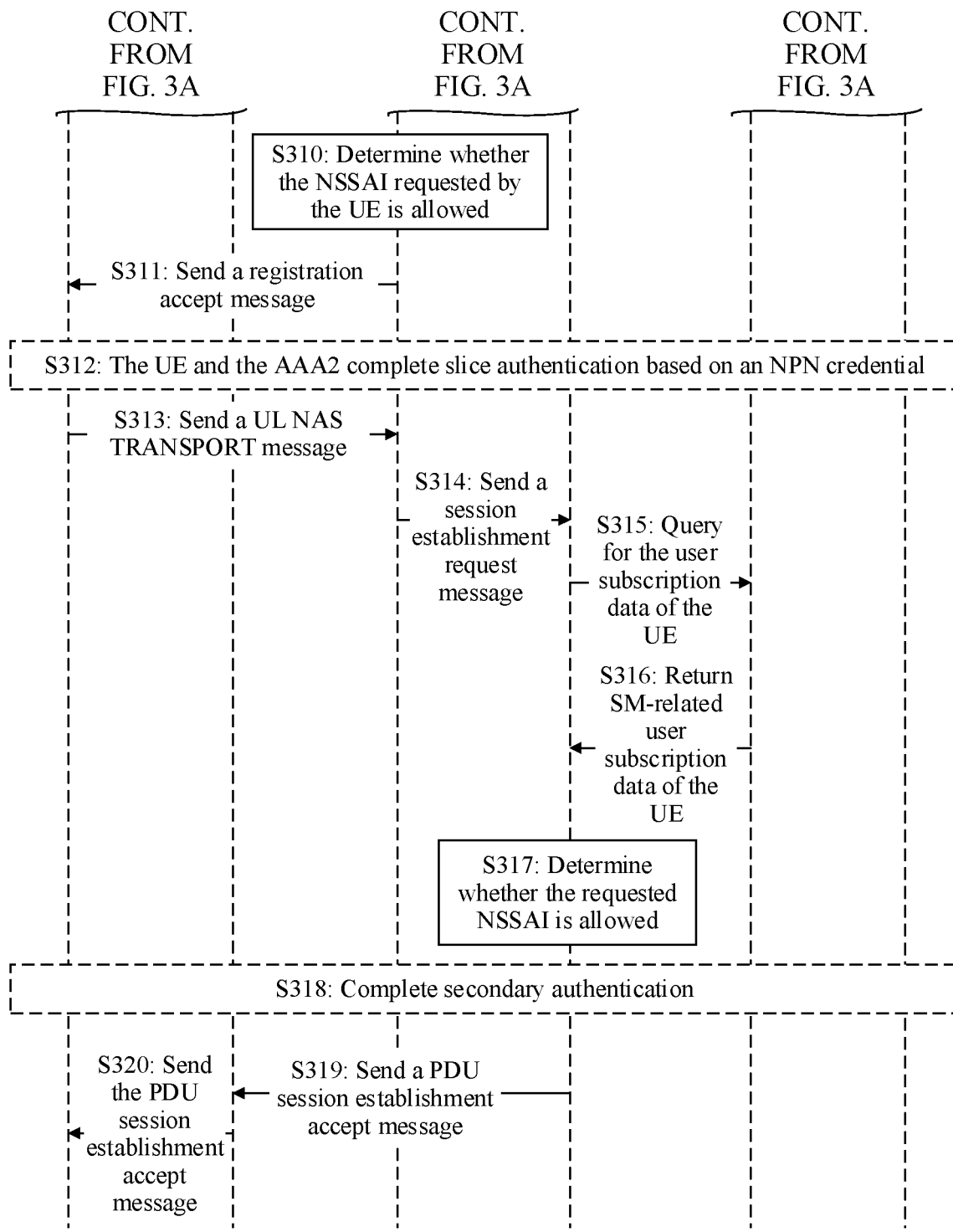

FIG. 3A and FIG. 3B show a process in which UE accesses a private network from a public network in a PNI-NPN scenario in the conventional 5G technology. It is assumed that the UE has obtained configuration information and a private network credential. The process specifically includes the following steps.

S301: A RAN broadcasts a CAG ID.

S302: The UE selects a network according to a configured mobility restriction (mobility restriction) policy, where the mobility restriction policy may be used to indicate a cell that the UE can access. During network selection, the UE selects a CAG ID indicated by using the mobility restriction policy. The mobility restriction policy is dynamically configured by a PLMN for the UE.

S303: The UE determines, based on a slice identifier privacy indication (Inclusion of NSSAI in RRC Connection Establishment Allowed) obtained during previous registration, whether network slice selection assistance information (Network Slice Selection Assistance Information, NSSAI) needs to be carried in an RRC message, to protect privacy information of the UE.

S304: The UE sends the RRC message to the RAN. It is determined, based on the inclusion of NSSAI in RRC connection establishment allowed indication, whether the message carries the NSSAI, and the RRC message may be an RRC establishment complete message. The UE further sends a registration request message to an AMF, where the registration request message may include a set including onboarded NSSAI. The registration request message may be loaded on the RRC message. The set including onboarded NSSAI may be preconfigured on the terminal, or may be dynamically configured by the PLMN for the UE.

S305: If the RRC message carries the NSSAI, the RAN selects an appropriate AMF based on the NSSAI.

S306: The RAN forwards the registration request message to the AMF.

S307: The UE and the PLMN network perform initial authentication based on a UE ID (an SUPI) and a PLMN authentication credential (K). An authentication path is UE-AMF-AUSF-UDM.

S308: The AMF queries the UDM for user subscription data of the UE.

S309: The UDM returns user subscription data related to mobility management of the UE, where the user subscription data includes allowed NSSAI, a CAG that allows to be accessed, the inclusion of NSSAI in RRC connection establishment allowed, and a secondary authentication indication.

S310: The AMF determines, based on NSSAI in a NAS message and the NSSAI obtained from the user subscription data, whether the NSSAI requested by the UE is allowed.

The AMF determines, based on the CAG ID and a currently connected base station, whether the UE is allowed to access the CAG cell.

S311: The AMF sends a registration accept message to the UE, where the message includes the inclusion of NSSAI in RRC connection establishment allowed indication. The UE may update the parameter stored in the UE.

S312: Optionally, after completing registration, the AMF triggers slice authentication based on a slice authentication indication and/or the NSSAI and according to a local policy. In this case, the UE and AAA2 complete slice authentication based on the NPN credential. An authentication path is UE-AMF-AAA P-AAA2.

S313: The UE obtains a DNN and NSSAI (optional) according to a terminal route selection policy (URSP) (a mapping relationship between an application and a DNN and/or NSSAI) configured by the PLMN. To be specific, when the UE enables an application, the application triggers the UE to query the URSP to obtain the DNN and the NSSAI (optional). The UE uses the DNN and the NSSAI (optional) to initiate a PDU session establishment process. To be specific, the UE sends a UL NAS TRANSPORT message, where the message carries the DNN, the NSSAI (optional), and a PDU session establishment request message.

S314: The AMF selects an SMF based on the DNN and/or the NSSAI, and sends the DNN and/or the NSSAI and the PDU session establishment request message to the SMF.

S315: The SMF obtains the user subscription data of the UE from the UDM.

S316: The UDM returns user subscription data related to session management of the UE, where the user subscription data includes the allowed NSSAI, an allowed DNN, a user plane protection policy, and the secondary authentication indication.

S317: The SMF determines, based on the received NSSAI and the NSSAI obtained from the user subscription data, whether the requested NSSAI is allowed. The SMF determines, based on the received DNN and the DNN obtained from the user subscription data, whether the requested DNN is allowed. The SMF triggers secondary authentication based on the secondary authentication indication and/or the DNN and/or the NSSAI and according to the local policy.

S318: The UE and the AAA2 complete secondary authentication based on the NPN credential. An authentication path is UE-SMF-UPF-NPN AAA2.

S319: The SMF sends a PDU session establishment accept message to the UE. The SMF sends the RAN an N2 container including the user plane security policy.

S320: The RAN determines, according to the user plane security policy, whether to activate user plane encryption and integrity protection for the UE.

In the PNI-NPN scenario described in FIG. 3A and FIG. 3B, it can be learned from the process in which the UE accesses the private network from the public network that, information that needs to be used for accessing the private network on a UE side includes: the mobility restriction policy (used to select the CAG ID), the slice identifier privacy indication (used to indicate whether the NSSAI is carried in the RRC message), the URSP (used to indicate the mapping relationship between the NPN application and the NPN DN/NSSAI), and the private network credential used for secondary authentication/slice authentication.

In the PNI-NPN scenario described in FIG. 3A and FIG. 3B, it can be learned from the process in which the UE accesses the private network from the public network that, the public network needs to preconfigure the user subscription data, as shown in the following Table 1.

TABLE 1

| Field | Description | Determined by |
|---|---|---|
| GPSI list | Indicates an external identifier of the UE | Allocated by the private network |
| Internal group list | Indicates an internal group type | Allocated by the public network |
| External group list | Indicates an external group type | Allocated by the private network |
| S-NSSAI list | Indicates a set including slices that can be accessed by the UE | Allocated by the public network after the private network signs an agreement with the public network |
| DNN list | Indicates a set including DNNs that can be accessed by the UE | Allocated by the public network after the private network signs an agreement with the public network |
| CAG information | Indicates a CAG that can be accessed by the UE | Allocated by the public network after the private network signs an agreement with the public network |
| Inclusion of NSSAI in RRC connection establishment allowed | Whether to carry the NSSAI in the RRC message, to protect privacy of an NSSAI identifier | Security of the private network is related, and the private network determines whether to enable this feature |
| Slice authentication indication | Whether to perform slice authentication, to determine whether to allow slice access of the terminal | Security of the private network is related, and the private network determines whether to enable this feature |
| User plane security policy | User plane protection indication, indicating a level of protection required for an established session | Security of the private network is related, and a specific protection method is determined by the private network |
| Secondary authentication indication | Whether to perform secondary authentication, to determine whether to allow PDU session establishment of the terminal | Security of the private network is related, and the private network determines whether to enable this feature |

In the PNI-NPN scenario described in FIG. 3A and FIG. 3B, it can be learned from the process in which the UE accesses the private network from the public network that, the private network needs to preconfigure the private network credential of the UE.

In the conventional technology, it is assumed that the terminal, the public network, and the private network already have the information, and how the terminal accesses a network by using the information is defined. However, before the terminal is registered with the private network, the terminal, the public network, and the private network do not have any such information. How the terminal, the public network, and the private network obtain and synchronize the information is a problem that needs to be resolved.

To resolve the foregoing problem, embodiments of this application provide a communication method. In embodiments of this application, the terminal may obtain, in an online onboarding manner, the foregoing information that needs to be used.

First, related terms in embodiments are described as follows:

(1) Indication information of a private network is used to identify the private network. The indication information of the private network may be one or more of a DNN, a CAG ID, NSSAI, and an NPN ID. The indication information of the private network may be first indication information of the private network or second indication information of the private network. The first indication information and the second indication information are used to identify a same private network, and may be same indication information, or may be different indication information (in different information forms). For example, when a first private network is identified, the first indication information is a DNN of the first private network, and the second indication information is an NPN ID of the first private network (in other words, either the DNN or the NPN ID may identify the first private network). When the DNN cannot uniquely identify a private network, the NPN ID may be used to identify the private network, or the DNN and the NPN ID are used together to identify the private network.

The DNN is used to identify a data network that can be accessed by a terminal. When a DNN is assigned to a private network, the DNN may be used to identify the private network.

The CAG ID is used to identify a cell that can be accessed by the terminal. When a CAG ID is assigned to a private network, the CAG ID may be used to identify the private network.

The NSSAI is used to identify a slice that can be accessed by the terminal. When one piece of NSSAI is assigned to a private network, the NSSAI may be used to identify the private network.

The NPN ID is used to identify a private network, and may be a character string used to identify the private network.

(2) First onboarding information of a private network is information, at a private network granularity, that is related to the private network and that may be configured on a repository function network element in a public network. It may be understood that first onboarding information corresponding to each of a plurality of private networks may be configured on the public network. The first onboarding information of the private network is preconfigured on the repository function network element in the public network, and the repository function network element in the public network may update subscription data of the terminal in the public network based on the first onboarding information of the private network. The first onboarding information includes indication information of the private network. Optionally, the first onboarding information may further include any one or more of the following: a DNN, an NPN ID, network slice selection assistance information (Network Slice Selection Assistance Information, NSSAI), a CAG ID, a slice identifier privacy indication, a secondary authentication execution indication, a slice authentication execution indication, a user plane protection policy, and the like.

The slice identifier privacy indication, namely, inclusion of NSSAI in RRC connection establishment allowed, indicates whether confidentiality protection is required for slice identifier NSSAI.

The slice authentication execution indication, namely, a slice authentication indication, indicates whether to perform slice authentication, to determine whether to allow slice access of the terminal. When the private network uses a dedicated slice to obtain a public network resource, the terminal may perform slice authentication when accessing the private network.

The secondary authentication execution indication, namely, a secondary authentication indication, indicates whether to perform secondary authentication, to determine whether to allow PDU session establishment of the terminal. When the private network uses a dedicated DNN to obtain a public network resource, the terminal may perform secondary authentication when accessing the private network.

The user plane protection policy, namely, a user plane security policy, indicates a security protection policy of the terminal. The user plane protection policy may be specifically an encryption protection indication (required, preferred, or not needed) at a PDU session granularity and/or an integrity protection indication (required, preferred, or not needed) at the PDU session granularity.

A specific configuration manner may be preconfigured by the private network to the repository function network element in the public network through a capability exposure interface, or may be configured by an operator of the public network to the repository function network element in the public network based on an agreement signed with the private network.

A specific update manner may include manners such as adding and overwriting. When an update parameter of first onboarding information of the private network is a new value, the repository function network element adds the new value to a current value. When an update parameter of first onboarding information of the private network is an existing value, the repository function network element overwrites the current value with a new value. For example, when the repository function network element pre-updates a DNN list of the terminal, the repository function network element adds the DNN of first onboarding information of the private network to the current DNN list. When the repository function network element pre-updates a slice identifier privacy indication of the terminal, the repository function network element overwrites the current slice identifier privacy indication of the terminal with the slice identifier privacy indication of first onboarding information of the private network.

(3) Second onboarding information of a private network is information, at a private network granularity, that is related to the private network and that may be configured on a control plane network element in a public network. It may be understood that second onboarding information corresponding to each of a plurality of private networks may be configured on the public network. The second onboarding information of the private network may be configured on the control plane network element in the public network.

The second onboarding information includes indication information of the private network and an address of an online sign-up authentication device. Optionally, the second onboarding information further includes an address of an online sign-up device, a DNN, an NPN ID, NSSAI, a CAG ID, and a local policy of the online sign-up device and/or the private network.

The address of the online sign-up authentication device is used to address the online sign-up authentication device, and may be an IP address, an Ethernet address, or the like of the online sign-up authentication device.

The address of the online sign-up device is used to address the online sign-up device, and may be an IP address, an Ethernet address, or the like of the online sign-up device.

The local policy indicates whether the private network indicated by the indication information of the private network needs to perform online onboarding authentication, to assist the control plane network element in determining, according to the indication information of the private network, whether to perform online onboarding authentication. For example, when the control plane network element obtains the indication information of the private network, and the local policy is that the private network indicated by the indication information of the private network needs to perform online onboarding authentication, the control plane network element determines to perform online onboarding authentication.

(4) User subscription data of a terminal in a public network: subscription data. The user subscription data of the terminal in the public network may be updated based on first onboarding information of a private network.

(5) Configuration information of a terminal is used by the terminal to select an access and mobility management related parameter of a private network and a session management policy, of the terminal, for establishing a private network session. The access and mobility management related parameter includes a mobility restriction policy and allowed NSSAI. The session management policy of the terminal includes a URSP. The mobility restriction policy is used to control service access of the terminal.

Particularly, if the mobility restriction policy includes a CAG ID, it may be indicated that the terminal is allowed to access a CAG cell corresponding to the CAG ID.

The allowed NSSAI indicates NSSAI that the terminal is allowed to access.

The URSP indicates the terminal to determine how to route an external data flow.

(6) A private network credential of a terminal is used by a private network to determine whether the terminal is allowed to access the private network. The credential includes a private network authentication credential of the terminal, and optionally, further includes a private network identity of the terminal. The private network identity is used by the private network to identify the terminal, and may be a GPSI.

The private network authentication credential is used by the private network to authenticate the terminal (for example, AAA2 authenticates the terminal), and may be a certificate, a symmetric key, or the like.

(7) Online onboarding: Deliver a network authentication credential to a terminal that has no network authentication credential, so that the terminal can access a network by using the authentication credential.

First, the following preset steps may be performed to configure, in a public network, information related to a private network.

(1) First onboarding information of the private network is configured on a repository function network element in the public network, so that after a terminal is successfully registered with the private network subsequently, the public network may update subscription data of the terminal in the public network based on the first onboarding information of the private network.

The repository function network element may be a data management network element and/or a data repository network element. The data management network element and the data repository network element may be integrated into one network element, or may be two network elements independent of each other.

(2) Optionally, second onboarding information of the private network is configured on a control plane network element in the public network, so that the control plane network element can obtain an address of a corresponding online sign-up authentication device or an address of a corresponding online sign-up server based on the second onboarding information.

The control plane network element may be a session management network element or an access management network element.

Specifically, the communication method includes the following steps.

S401: A terminal sends first network information of a private network to a control plane network element in a public network, where the first network information includes first indication information of the private network.

The first indication information of the private network indicates a private network that the terminal requests to access, a private network in which the terminal requests to perform online onboarding, or a private network in which the terminal is onboarded.

The first indication information of the private network may include a DNN, NSSAI, a CAG ID, and an NPN ID.

Optionally, the first network information may further include an onboarding request indication, and the onboarding request indication indicates that the control plane network element needs to initiate onboarding delivery authentication.

That a terminal sends first network information of a private network to a public network includes: The terminal sends the first network information of the private network to the control plane network element in the public network. Specifically, any one of the following manners may be used.

Manner 1: When the control plane network element is an access management network element, the terminal sends a first NAS message of the private network to the access management network element, where the message carries the first network information of the private network. The first NAS message may be a newly added message. For details, refer to the subsequent Embodiment 2 corresponding to FIG. 6.

Manner 2: When the control plane network element is a session management network element, the terminal sends the session management network element a session request message, used to request to establish a first session, where the session request message carries the first network information of the private network. For details, refer to the subsequent Embodiment 1 corresponding to FIG. 5.

Optionally, before step S401, the method further includes a step in which the terminal obtains second network information of the private network, and obtains the first network information of the private network based on the second network information. The first network information may include all or a part of content in the second network information. The second network information includes one or more of a CAG ID, a DNN, NSSAI, an AAA address, an OSU address, an NPN ID, and the like.

That the terminal obtains second network information of the private network specifically includes: The terminal may obtain second network information of one or more private networks. Any one of the following manners may be specifically used in this process.

Manner A: The terminal obtains second network information of one or more private networks from a broadcast message of an access network.

The access network broadcasts second network information of a plurality of private networks. Optionally, the access network further broadcasts an online onboarding support indication corresponding to the second network information, where the online onboarding support indication indicates that the private network corresponding to the second network information supports online onboarding.

That the terminal obtains second network information of one or more private networks from a broadcast message of an access network specifically includes:

The terminal obtains a plurality of pieces of second network information from the broadcast. Optionally, if the access network further broadcasts an online onboarding support indication corresponding to the second network information, the terminal obtains, from the broadcast, only all second network information including the online onboarding indication.

The terminal may further display, on a screen of the terminal based on the plurality of pieces of second network information in the broadcast, the private networks corresponding to the second network information. Optionally, the terminal selects, from the broadcast, only private networks corresponding to all second network information including the online onboarding indication. A user selects from all the displayed private networks. After the user selects a private network, the terminal obtains second network information of the private network.

Manner B: The terminal obtains an access network identifier of one or more private networks from a broadcast message of an access network, and obtains second network information of the private network from a path information mapping network element based on the access network identifier of the private network. For details, refer to Embodiment corresponding to FIG. 7.

Manner C: The terminal obtains second network information from an application server in the private network.

A specific implementation is as follows: The terminal sends, by using a user plane, the application server in the private network an application request, used to request the obtained second network information of the private network. The application server in the private network sends an application reply message to the terminal, where the reply message includes the second network information of the private network.

That the terminal obtains the first network information of the private network based on the second network information specifically includes:

If the terminal obtains second network information of a plurality of private networks, the terminal selects a private network corresponding to one piece of second network information from the second network information of the plurality of private networks, and obtains first network information of the private network. Optionally, the terminal may use a one-by-one selection method, or select a private network with a strong signal based on signal strength.

The terminal obtains first network information of the private network based on a part or all of second network information of the private network. For example, if the second network information of the private network includes a CAG ID, a DNN, NSSAI, an address of an online sign-up authentication device, and an address of an online sign-up server, the terminal may select the DNN as the first network information of the private network.

S402: Optionally, the control plane network element determines, based on the first network information, that onboarding delivery authentication needs to be performed on the terminal, where onboarding delivery authentication is used to authorize a terminal on which authentication succeeds to perform online onboarding.

Specifically, any one of the following manners may be used to determine that onboarding delivery authentication needs to be performed on the terminal.

Manner 1: Search for second onboarding information of the private network (for example, obtain a policy in the second onboarding information of the private network through searching) based on the first indication information of the private network in the first network information, and determine, based on the second onboarding information of the private network, that onboarding delivery authentication needs to be performed on the terminal.

Manner 2: Determine, based on the onboarding request indication (indicating that onboarding delivery authentication needs to be performed) in the first network information, that onboarding delivery authentication needs to be performed on the terminal.

S403: The control plane network element triggers an onboarding delivery authentication procedure between the terminal and the online sign-up authentication device.

Optionally, the control plane network element sends the online sign-up authentication device a first message, used to trigger the onboarding delivery authentication procedure between the terminal and the online sign-up authentication device.

Optionally, the control plane network element sends the terminal the first message, used to trigger the onboarding delivery authentication procedure between the terminal and the online sign-up authentication device.

Optionally, before step S403, the method further includes: The control plane network element queries the second onboarding information of the private network based on the first indication information of the private network to obtain the address of the online sign-up authentication device, where the second subscription data includes a correspondence between the address of the online sign-up authentication device and the first indication information of the private network.

If the control plane network element queries the second onboarding information based on the indication information of the private network to obtain addresses of two online sign-up authentication devices (for example, AAA1 is used for onboarding delivery authentication, and AAA2 is used for secondary authentication performed after the terminal obtains a private network credential), the control plane network element may further determine, based on the onboarding request indication, that the first message needs to be sent to corresponding AAA1 to trigger onboarding delivery authentication.

S404: The terminal performs onboarding delivery authentication with the online sign-up authentication device through the public network.

Specifically, the control plane network element serves as an intermediate node to transit authentication signaling between the terminal and the online sign-up authentication device, to implement two-way authentication between the terminal and the online sign-up authentication device.

For example, when the control plane network element is an access management network element, onboarding delivery authentication, in the private network, between the terminal and the online sign-up authentication device may be slice authentication.

For example, when the control plane network element is a session management network element, onboarding delivery authentication, in the private network, between the terminal and the online sign-up authentication device may be secondary authentication.

S405: The control plane network element returns a second message to the terminal based on a result of onboarding delivery authentication.

Because onboarding delivery authentication is triggered by the control plane network element, the control plane network element is needed for a subsequent onboarding delivery authentication process between the terminal and the online sign-up authentication device. Therefore, the control plane network element may obtain a result indicating whether onboarding delivery authentication succeeds.

A specific process in which the control plane network element returns the second message to the terminal based on the authentication result may be any one of the following cases:

Case A: Onboarding delivery authentication succeeds, and the control plane network element returns an accept message to the terminal, and performs step 406. Step 406 and the step of returning the accept message to the terminal are not in a sequence. The steps may be performed at the same time; the step of returning the accept message to the terminal is performed before step 406; or step 406 is performed before the step of returning the accept message to the terminal.

Optionally, the accept message carries one or more of a temporary indication and the address of the online sign-up server. The temporary indication indicates that the terminal re-attempts to access the private network after a period of time, and includes a temporary registration indication or a temporary session indication.

The control plane network element may specifically return the accept message to the terminal in the following two manners:

Manner 1: When the control plane network element is an access management network element, the access management network element returns a first NAS response message, used to reply to the first NAS message. Optionally, the first NAS response message includes one or more of the temporary registration indication and the address of the online sign-up server.

Manner 2: When the control plane network element is a session management network element, the session management network element establishes the first session for the terminal, and returns a session establishment response message to the terminal, where the session establishment response message indicates that the first session has been established. Optionally, the session establishment response message includes one or more of the temporary session indication and the address of the online sign-up server.

Case B: When onboarding delivery authentication fails, the control plane network element returns a rejection message to the terminal.

Optionally, the rejection message carries a first cause value, and the first cause value indicates that onboarding delivery authentication fails. After receiving the rejection message, the terminal may attempt to select first network information of another private network, and re-perform step S401. For details, refer to Embodiment 1 corresponding to FIG. 5.

The foregoing two cases are merely two possible cases, and this application does not exclude another case.

Optionally, before step S401, the terminal obtains second network information of a plurality of private networks. After receiving the rejection message, the terminal selects second network information of another private network from the second network information of the plurality of private networks, and obtains first network information of the another private network based on the second network information of the another private network.

For a terminal without a screen, the terminal cannot manually select a network. Therefore, the terminal attempts to access a network in a manner of blindly selecting a network, and performs online onboarding authentication. If authentication fails, it indicates that the UE selects an incorrect private network, and the UE attempts to select a next private network until authentication succeeds, to perform online onboarding. In this way, the terminal without a screen may also successfully complete online onboarding.

S406: After onboarding delivery authentication succeeds, the control plane network element sends a repository function network element a third message, used to trigger the repository function network element to update user onboarding information of the terminal, where the third message carries a terminal identifier and second indication information of the private network. The second indication information is obtained by the control plane network element based on the first indication information.

The control plane network element may obtain the second indication information based on the first indication information. The first indication information and the second indication information may be the same, for example, both are DNNs. Alternatively, the second indication information is obtained by the control plane network element through conversion based on the first indication information. For example, if the first indication information received by the control plane network element is a DNN, the control plane network element obtains, based on the first indication information, corresponding second indication information: an NPN ID, and sends the NPN ID to the repository function network element.

The terminal identifier, for example, an SUPI, is used to identify the terminal in the public network.

Optionally, the third message further includes a GPSI, the GPSI is used by the private network to identify the terminal, and the GPSI may be generated by the terminal and the online sign-up authentication device in the onboarding delivery authentication process.

When the repository function network element is a data management network element and/or a data repository network element, any one of the following manners may be used in a process in which the control plane network element sends the repository function network element a message, used to trigger the repository function network element to update the user onboarding information of the terminal.

Manner 1: The control plane network element sends a message to the data management network element, to trigger the data management network element to update context information of the terminal on the data management network element.

Manner 2: The control plane network element sends a message to the data repository network element, to trigger the data repository network element to update context information of the terminal on the data management network element.

Manner 3: The control plane network element sends a message to the data management network element, to trigger the data management network element to update context information of the terminal on the data management network element. Then the data management network element sends a message to the data repository network element, to trigger the data repository network element to update onboarding information of the terminal on the data repository network element.

Manner 4: The control plane network element sends a message to the data management network element, to trigger the data management network element to update context information of the terminal on the data management network element, and the control plane network element sends a message to the data repository network element, to trigger the data repository network element to update the context information of the terminal on the data management network element.

S407: The repository function network element obtains, based on the second indication information of the private network, first subscription data corresponding to the private network, and the repository function network element updates user subscription data of the terminal based on the obtained first subscription data of the private network.

The repository function network element obtains the user subscription data of the terminal based on the terminal identifier, and the repository function network element obtains first onboarding information of the private network through querying based on the second indication information (refer to the preset step 1). The repository function network element updates the user subscription data of the terminal based on the first onboarding information.

For example, the repository function network element overwrites a slice identifier privacy indication in the user subscription data of the terminal with a slice identifier privacy indication indicated by the first onboarding information.

The repository function network element adds, to the user subscription data of the terminal, a secondary authentication execution indication, a slice authentication execution indication, and a user plane protection policy that are indicated by the first onboarding information.

The repository function network element adds, to a CAG ID list in the user subscription data of the terminal, a CAG ID indicated by the first onboarding information.

The repository function network element adds, to a DNN list in the user subscription data of the terminal, a DNN indicated by the first onboarding information.

The repository function network element adds, to an NSSAI list in the user subscription data of the terminal, NSSAI and the like that are indicated by the first onboarding information.

Optionally, the repository function network element further updates the user subscription data of the terminal based on the GPSI.

Optionally, when indication information of the private network is used only to identify the first onboarding information of the private network, the repository function network element does not need to update the indication information of the private network in the user subscription data of the terminal.

As a result, the public network completes the update of the user subscription data of the terminal.

S408: The repository function network element triggers a procedure to update configuration information on the terminal, and the terminal receives configuration information of the public network through the public network.

The configuration information includes one or more of an access and mobility management related parameter and a session management policy.

That the repository function network element updates the session management policy that is on the terminal includes the following steps: The repository function network element may trigger a PLMN PCF to perform a terminal configuration update procedure for transparent terminal policy delivery, to update a URSP on a terminal side. The URSP includes a mapping relationship between an NPN application and a DNN and/or NSSAI corresponding to the NPN, so that the terminal obtains the DNN and/or the NSSAI corresponding to the NPN when using the NPN application, to establish a PDU session for accessing an NPN DNN. As a result, the terminal side completes the update of configuration information related to the session management policy in a PLMN.

That the repository function network element updates the access and mobility management related parameter on the terminal includes the following steps: The repository function network element may trigger a PLMN data management network element to perform a terminal configuration update procedure for access and mobility management related parameters, to update a mobility restriction policy and/or allowed NSSAI on the terminal side. The mobility restriction policy includes a CAG ID corresponding to the NPN. In this way, the terminal may select a cell corresponding to the CAG ID for access when accessing the NPN. Optionally, the allowed NSSAI of the terminal is further updated, so that during registration, the terminal can provide information for a RAN/an access management network element to select a network. As a result, the terminal side completes the update of configuration information related to the mobility management policy in the PLMN.

S409: The terminal obtains the private network credential through the public network from the online sign-up server in the private network.

The private network credential includes one or more of an NPN identity and an NPN authentication credential.

A process in which the terminal obtains the private network credential through the public network from the online sign-up server includes:

The terminal obtains the address of the online sign-up server, and obtains the private network credential from the online sign-up server based on the first session and the address of the online sign-up server, where the first session is a session established between the terminal and the public network.

When the control plane network element is a session management network element, the first session has been established in step S405, and in step S409, the private network credential may be transmitted by using the established first session. Specifically, after authentication of the private network succeeds, the terminal receives a response message returned by the session management network element, indicating that the first session has been established. Then, the terminal accesses, by using the first session, the online sign-up server corresponding to the address of the online sign-up server, and obtains the private network credential related to the NPN.

When the control plane network element is an access management network element, after step S405 and before step S409, the method further includes a process in which the terminal establishes the first session with the public network. Specifically, after authentication of the private network succeeds, the terminal sends a session request message to the session management network element, and establishes the first session through the session management network element. Then, the terminal accesses, by using the first session, the online sign-up server corresponding to the address of the online sign-up server, and obtains the private network credential related to the NPN.

Specifically, the terminal may obtain the address of the online sign-up server in any one of the following manners:

Manner 1: The terminal obtains the address of the online sign-up server from the second network information.

Manner 2: The terminal receives the address of the online sign-up server returned by the public network in step S405.

S410: The terminal selects, based on the configuration information of the public network and the private network credential, the private network for access.

Optionally, the terminal may select, based on the configuration information of the public network and the private network credential by using the method shown in FIG. 3A and FIG. 3B, a private network for re-accessing.

Optionally, after step S408 is completed, the public network sends a deregistration request message to the terminal, to enable the terminal to enter a deregistration state. Then, the terminal selects, based on the configuration information of the public network and the private network credential, a private network for access.

Optionally, after step S408 is completed, the public network sends a session release request message to the terminal, to enable the terminal to release the first session. Then, the terminal selects, based on the configuration information of the public network and the private network credential, a private network for access.

Specifically, the public network may start a timer after onboarding delivery authentication or S408 is completed. After the timer expires, the public network sends the deregistration request message or the session release request message to the terminal.

Optionally, when receiving the temporary indication (the temporary session indication or the temporary registration indication) in step 405, the terminal starts a timer (where the timer may be preset on the terminal, or may be sent by a network side to the terminal). After the timer expires, the terminal selects, based on the received configuration information of the public network and the received private network credential, a private network for access.

If the temporary indication is the temporary registration indication, after the timer expires, the terminal first enters the deregistration state, and then selects, based on the received configuration information of the public network and the received private network credential, a private network for access. In this case, the terminal reselects an access network (for example, reselects a CAG based on the access and mobility management related parameter).

If the temporary indication is the temporary session indication, after the timer expires, the terminal releases only the first session, and then selects, based on the received configuration information of the public network and the received private network credential, a private network for access. In this case, the terminal does not need to reselect an access network, and directly re-establishes a new session to access the private network.

Figure 4A:
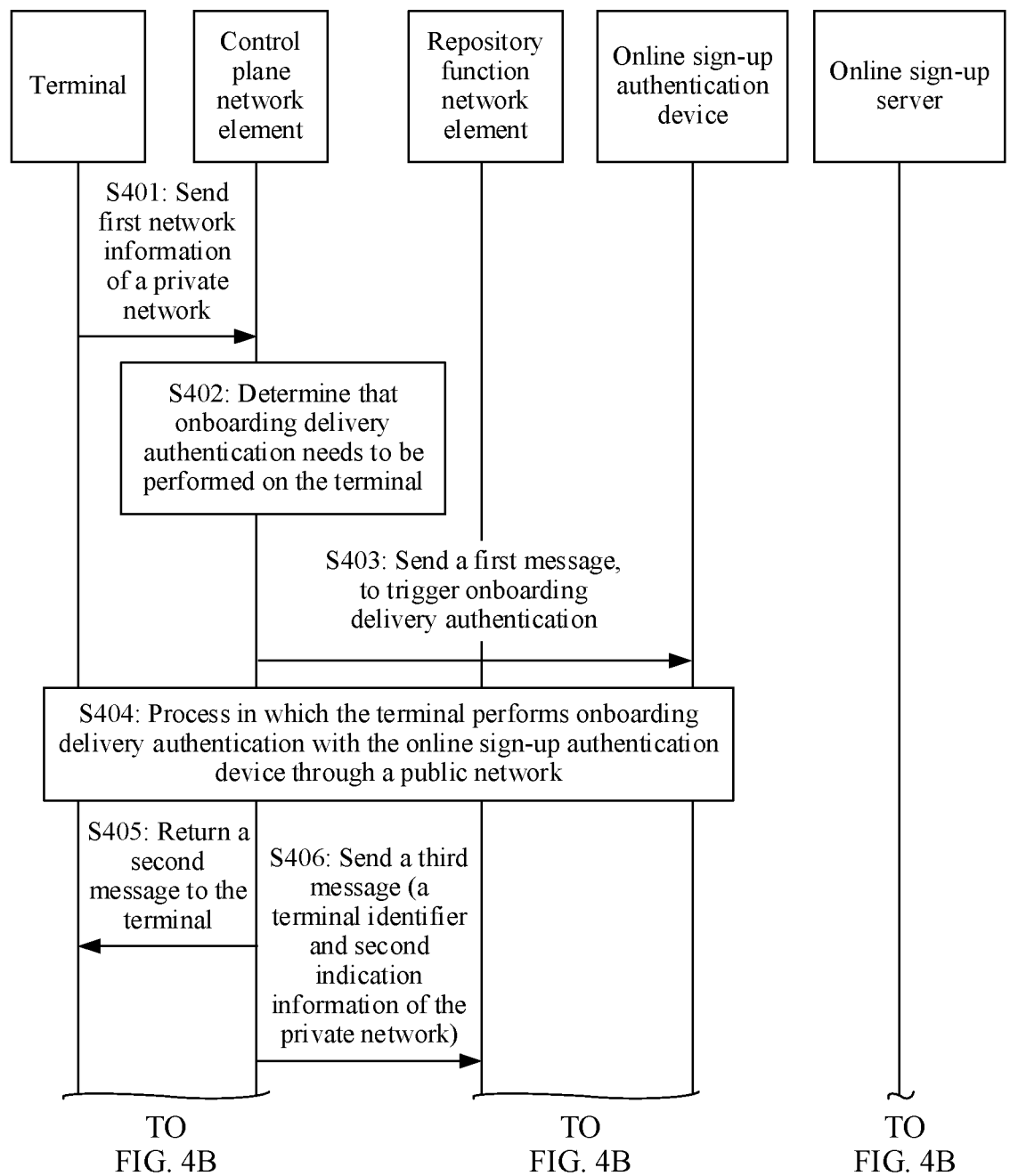
FIG. 4A and FIG. 4B are a schematic flowchart of a communication method according to an embodiment of this application.
Figure 4B:
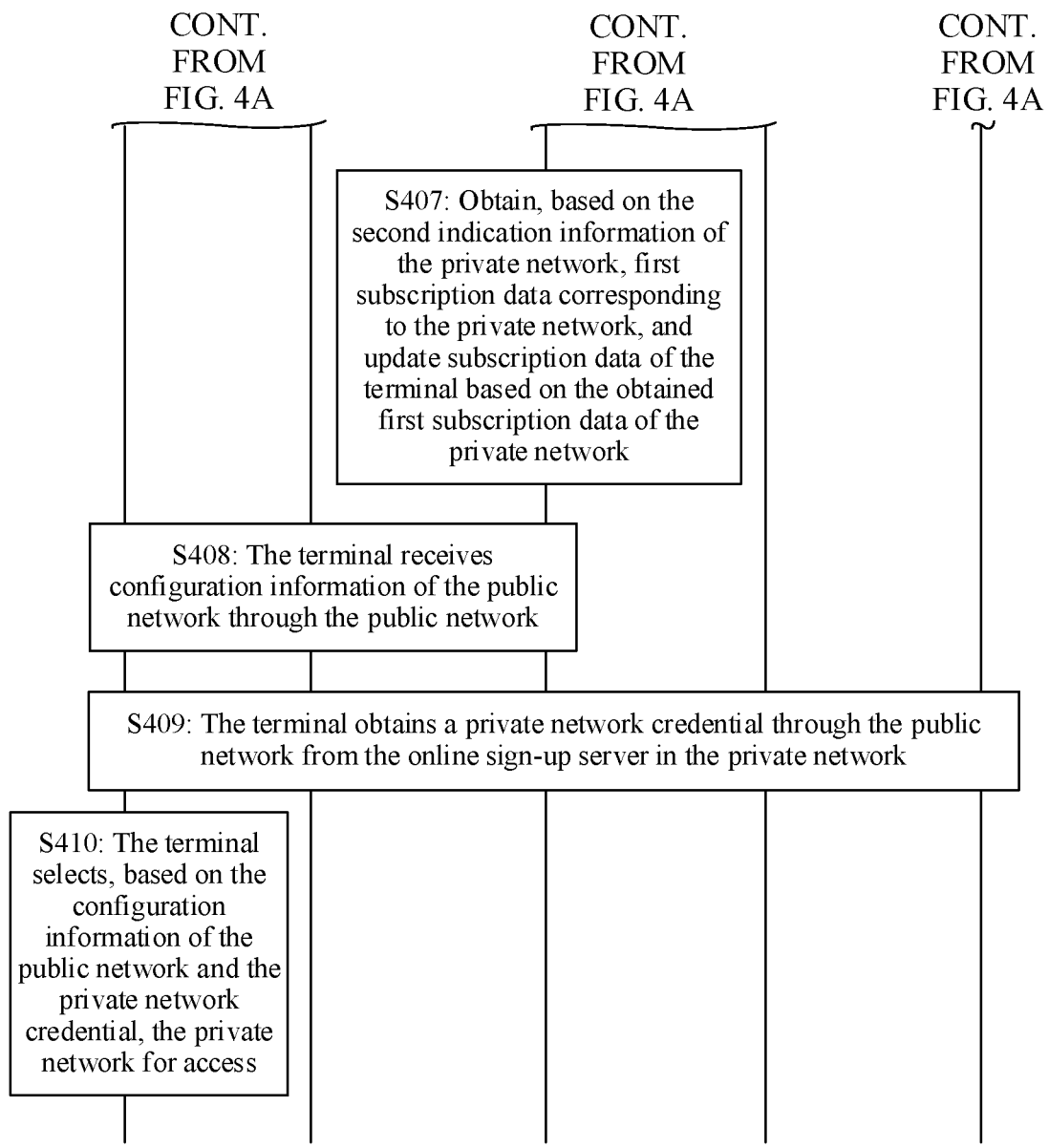

According to the method shown in FIG. 4A and FIG. 4B, the terminal sends the first network information of the private network to the public network, and performs authentication of the private network through the public network. After authentication of the private network succeeds, the terminal receives the configuration information of the public network through the public network, and obtains the private network credential through the public network from the online sign-up server in the private network. Because the terminal obtains the configuration information of the public network and the private network credential, and the public network updates the user subscription data of the terminal, the terminal may subsequently access the private network through the public network based on the information.

Figure 5:
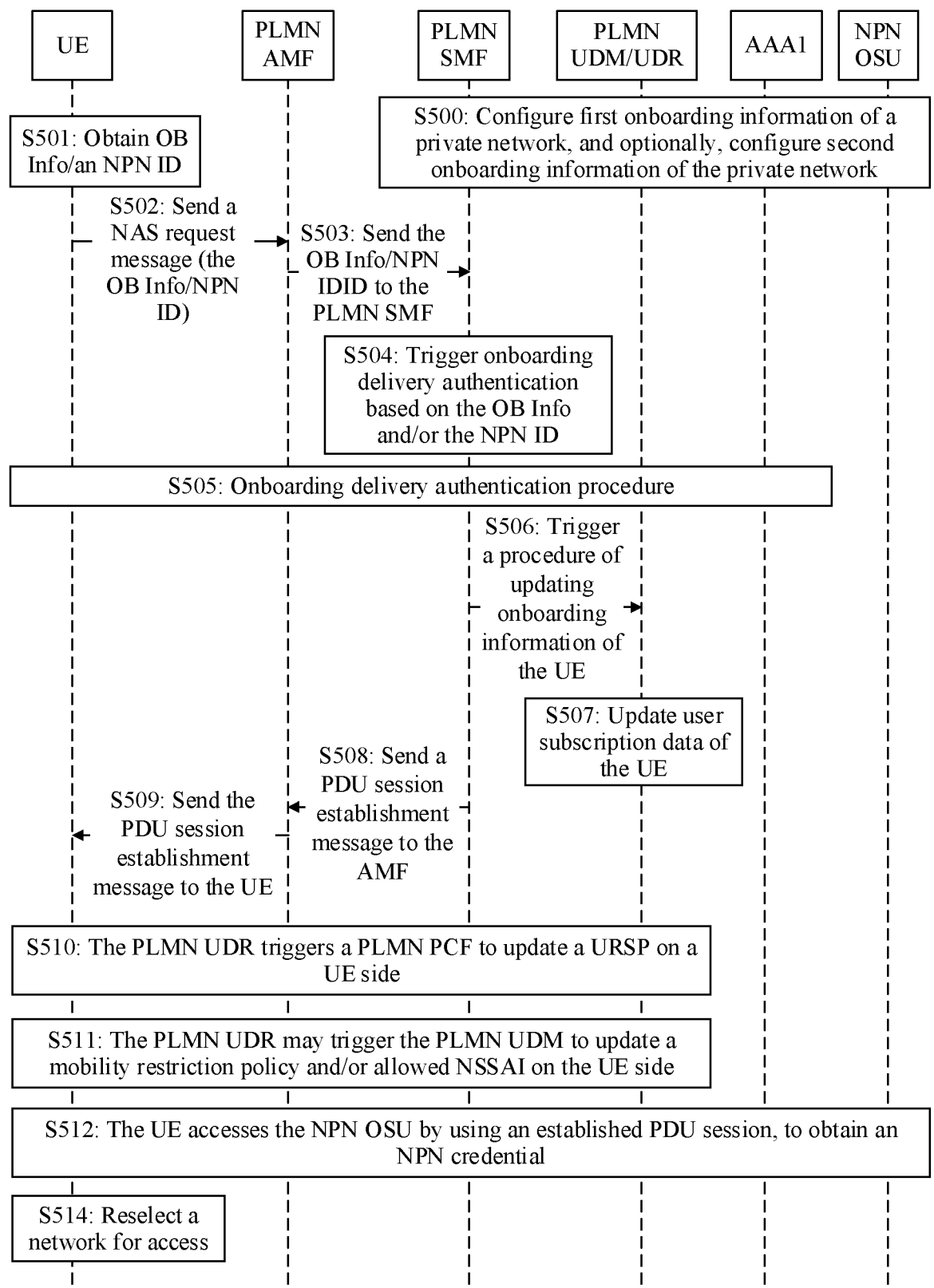
FIG. 5 shows a specific example of a communication method according to an embodiment of this application.
Figure 6:
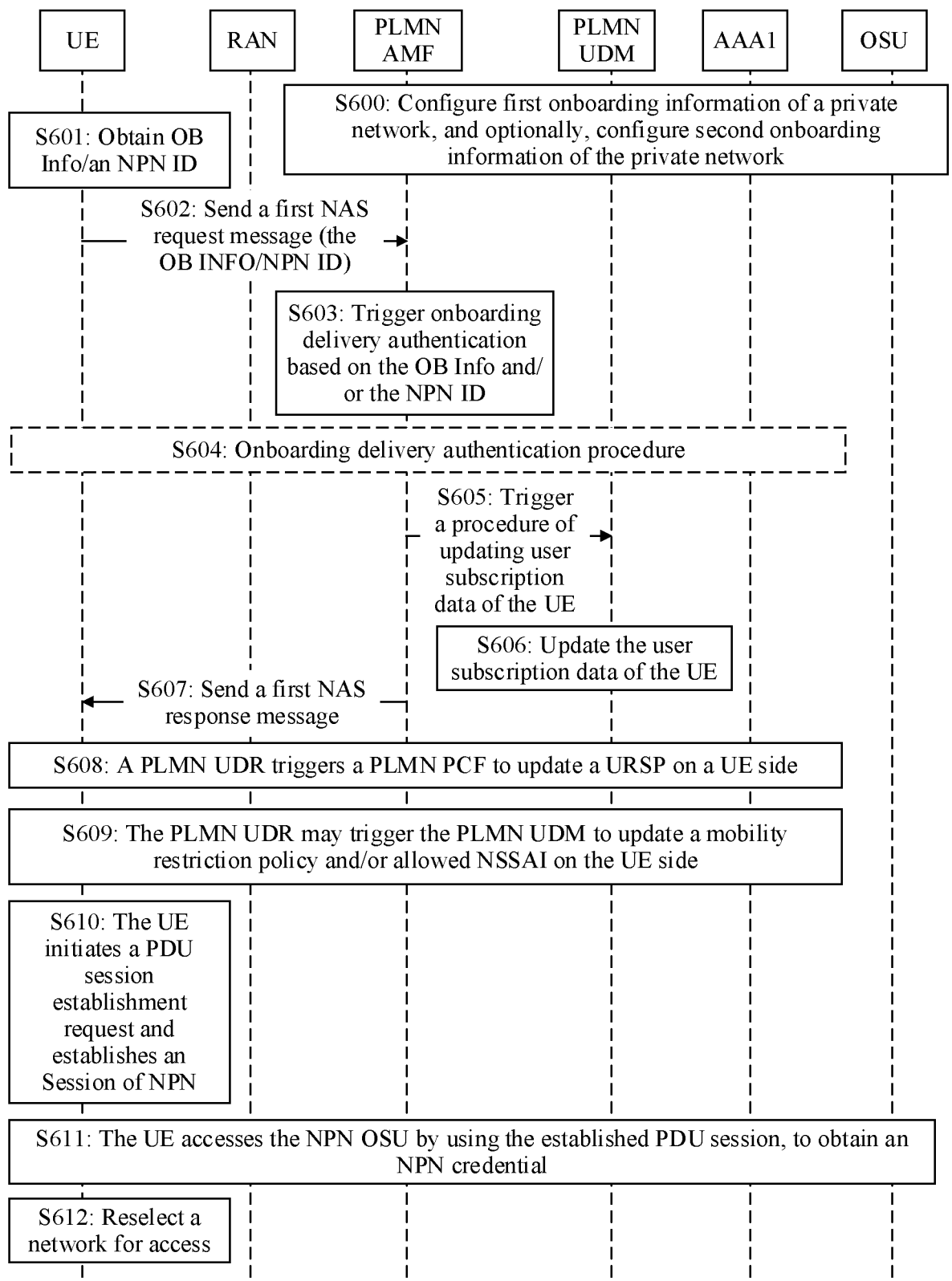
FIG. 6 shows another specific example of a communication method according to an embodiment of this application.
Figure 7:
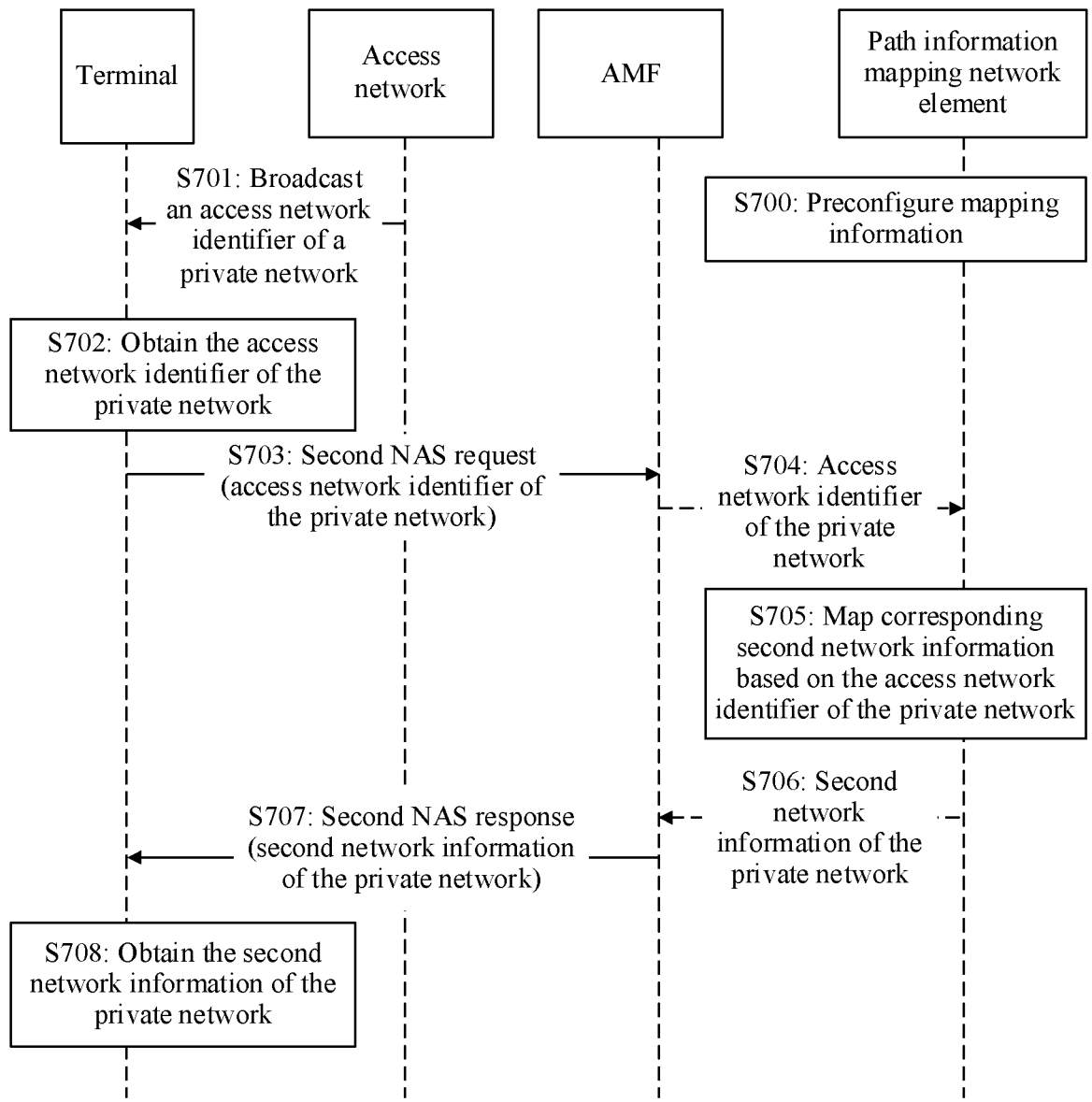
FIG. 7 is a schematic diagram of a method for obtaining second network information of a private network by a terminal according to an embodiment of this application.

The following describes the communication method in FIG. 4A and FIG. 5 in detail by using an example with reference to specific embodiments corresponding to FIG. 5 to FIG. 7. For ease of description, subsequently, this application is described by using an example in which the access management network element is an AMF network element, the session management network element is an SMF network element, the data repository network element is a UDR network element, the data management network element is a UDM network element, the online sign-up authentication device is an AAA network element, the online sign-up server is an OSU server network element, and the policy control network element is a PCF network element. Further, the AMF network element is referred to as an AMF for short, the SMF network element is referred to as an SMF for short, the UDR network element is referred to as a UDR for short, the UDM network element is referred to as UDM for short, and the like. To be specific, in subsequent descriptions in this application, the AMF may be replaced with the access management network element, the SMF may be replaced with the session management network element, the UDR may be replaced with the data repository network element, the UDM may be replaced with the data management network element, the PCF may be replaced with the policy control network element, and the like.

Embodiment 1

FIG. 5 shows a specific example of a communication method according to an embodiment of this application. In this embodiment, a control plane network element is an SMF, and the SMF triggers an onboarding delivery authentication procedure (for example, secondary authentication). The SMF obtains an authentication success result, and notifies UDM/a UDR to update PLMN onboarding information of UE stored in the UDM/UDR. The method includes the following steps.

S500: Preconfigure first onboarding information of an NPN in the PLMN UDM/UDR in advance, to configure the PLMN onboarding information for a terminal that is successfully registered with the NPN.

Optionally, the onboarding information may be configured by the NPN to the PLMN UDM/UDR through a capability exposure interface, or may be configured by an operator according to a policy. The first onboarding information of the NPN may include an external group ID (information used by the NPN to identify a group to which the terminal belongs), a slice identifier privacy indication (indicating whether slice identifier NSSAI requires confidentiality protection), an onboarding delivery authentication execution indication (indicating whether the terminal needs to perform onboarding delivery authentication, where onboarding delivery authentication in Embodiments 1 and 3 may be secondary authentication, and onboarding delivery authentication in Embodiment 2 may be slice authentication), a user plane protection policy (indicating a security protection policy of the terminal, and may be an encryption protection indication (required, preferred, or not needed) at a PDU session granularity and/or an integrity protection indication (required, preferred, or not needed) at the PDU session granularity), an NPN ID (which is used to identify an NPN on which on-boarding can be performed, and may be a CAG ID, or may be a character string used to identify the NPN), a CAG ID (where if the NPN ID is not a CAG ID, the CAG ID is used to identify a cell that the UE can access when accessing the NPN), a DNN (used to identify a data network, of the NPN, accessed by the UE), and NSSAI (used to identify a slice, of the NPN, accessed by the UE). It should be noted that, for which one that configures the foregoing parameters, refer to the table 1 in the conventional technology.

Optionally, second onboarding information of the NPN is preconfigured in the PLMN SMF in advance, and is used by the SMF to address AAA. The second onboarding information of the NPN may include an NPN ID, an AAA address (which is used by the SMF to address the AAA, and may be an IP address, a MAC address, or the like of the AAA), an OSU address, and the like.

S501: The UE obtains OB Info.

The OB Info is used by the UE to establish a communication path for accessing a DN in which an OSU is located, and may include a DNN. Optionally, the OB Info may further include one or more of NSSAI, an AAA1 address, the OSU address, and the like.

Optionally, the UE further obtains the NPN ID. The NPN ID is used to identify an NPN in which on-boarding can be performed, and may be a CAG ID, or may be a character string used to identify the NPN.

For a method for obtaining the OB Info/ID by the UE, refer to a subsequent embodiment.

S502: The UE sends a NAS request message to a PLMN AMF, where the NAS request message includes the OB Info.

Before this step, the UE has accessed a public network and obtained configuration information of the public network.

S503: The PLMN AMF sends the OB Info to the PLMN SMF.

Optionally, the NAS request message further includes the NPN ID.

Optionally, the NAS request message further includes an onboarding request indication, and the onboarding request indication indicates the SMF to initiate onboarding delivery authentication.

Specifically, the UE sends a UL NAS TRANSPORT message to the PLMN AMF, where the NAS TRANSPORT message further includes the OB Info and a PDU session establishment request message. Optionally, the NAS TRANSPORT message may further include one or more of the NPN ID and the onboarding request indication. The NPN ID or the onboarding request indication may be independent of the PDU session establishment request message, or may be placed in the PDU session establishment request message.

In an implementation, the UE sends the UL NAS TRANSPORT message to the PLMN AMF, where the message may carry the OB Info, and optionally, further include the NPN ID. The UL NAS TRANSPORT message further includes an SM container, and the SM container includes the PDU session establishment request message. Optionally, the PDU session establishment request message includes the onboarding request indication.

In another implementation, the UE sends the UL NAS TRANSPORT message to the PLMN AMF, where the message may carry the OB Info. The UL NAS TRANSPORT message further includes an SM container, the SM container includes the PDU session establishment request message, and the PDU session establishment request message includes the onboarding request indication. Optionally, the PDU session establishment request message further includes the NPN ID.

For example, the UE sends the UL NAS TRANSPORT message to the PLMN AMF, where the message may carry the DNN and the NSSAI. The UL NAS TRANSPORT message further includes the SM container, the SM container includes the PDU session establishment request message, and the message includes the onboarding request indication and the NPN ID.

S504: The PLMN SMF triggers onboarding delivery authentication based on the OB Info and/or the NPN ID.

Specifically, the PLMN SMF obtains, based on the OB Info and/or the NPN ID, an AAA address corresponding to the OB Info and/or the NPN ID, and triggers onboarding delivery authentication of AAA identified by the AAA address. For example, the PLMN SMF searches for the previously configured second subscription data based on the OB Info and/or the NPN ID to obtain the AAA address corresponding to the OB Info and/or the NPN ID.

If two AAA addresses are obtained (for example, AAA1 is used for onboarding delivery authentication, and AAA2 is used for secondary authentication after onboarding is performed), the PLMN SMF may further select, based on the onboarding request indication, to trigger onboarding delivery authentication (onboarding request indication) of AAA identified by the AAA1. In the conventional technology, the PLMN SMF obtains only the AAA2, and therefore directly performs secondary authentication after onboarding is obtained. However, because the AAA1 is introduced in an online onboarding procedure, the PLMN SMF selects, based on the onboarding request indication, to trigger onboarding delivery authentication of the AAA identified by the AAA1.

Optionally, the step may further include: The PLMN SMF determines, based on the OB Info and/or the NPN ID, whether onboarding delivery authentication needs to be performed. Specifically, any one of the following implementations may be used.

In an implementation, the PLMN SMF searches for the second onboarding information based on the OB Info and/or the NPN ID, and finds that the second onboarding information requires to perform onboarding delivery authentication. In this case, the PLMN SMF determines that onboarding delivery authentication needs to be performed.

In another implementation, the PLMN SMF determines, based on the onboarding request indication, that onboarding delivery authentication is needed.

S505: The PLMN SMF initiates onboarding delivery authentication.

Specifically, the PLMN SMF serves as an intermediate node to transit authentication signaling between the UE and the AAA1, to implement two-way authentication between the UE and the AAA1. The authentication signaling may be carried in an EAP protocol, for example, EAP-TLS or EAP-AKA'. Optionally, the UE carries the EAP protocol by using NAS signaling, the NPN AAA carries the EAP protocol by using user plane data, and a communication path may be UE-AMF-SMF-UPF-AAA1. Onboarding delivery authentication may be secondary authentication.

S506: The SMF learns of a result of onboarding delivery authentication, and performs processing based on the result.

Specifically, because onboarding delivery authentication is triggered by the SMF, the SMF may obtain, from the AAA1, the result indicating whether onboarding delivery authentication succeeds.

If authentication succeeds, step S507 is performed, to be specific, the PLMN SMF triggers to update user subscription data of the UE. The PLMN SMF sends a UE ID (such as an SUPI) and the OB Info and/or the NPN ID to the PLMN UDM/UDR. Optionally, the PLMN SMF further sends a GPSI to the PLMN UDM/UDR. The GPSI is used by the NPN to identify the UE, and the GPSI may be generated by the UE and the AAA1 in an onboarding delivery authentication process.

If authentication fails, the PLMN SMF rejects a PDU session establishment request of the UE, and the UE cannot establish a PDU session for accessing the NPN. Optionally, the UE performs an automatic selection procedure with reference to Embodiment 3.

S507: The PLMN UDM/UDR updates, based on the UE ID and the OB Info and/or the NPN ID, the user subscription data of the UE corresponding to the UE ID.

In an implementation, the PLMN UDM/UDR obtains the user subscription data of the UE based on the SUPI, and the PLMN UDM/UDR obtains, based on the OB Info and/or the NPN ID, the first onboarding information of the NPN preconfigured in a preset condition 1. The PLMN UDM/UDR updates the user subscription data of the UE based on the first onboarding information. For example, the PLMN UDM/UDR modifies the user subscription data of the UE to the external group ID, the slice identifier privacy indication, the onboarding delivery authentication execution indication, the user plane protection policy, the CAG ID, the DNN, the NSSAI, and the like that are indicated by the first onboarding information. As a result, a PLMN network side completes the update of the stored user subscription data of the UE. In this manner, the SMF may directly request the UDM/UDR to update the user subscription data.

In another implementation, the PLMN SMF invokes a user subscription data update service provided by the PLMN UDM, and provides an identifier of a terminal whose user subscription data needs to be updated, and the OB Info and/or the NPN ID. The UDM obtains the to-be-updated user subscription data of the UE based on the terminal identifier and the OB Info and/or the NPN ID, and invokes a data management update service of the UDR, to update the user subscription data of the terminal stored in the UDR. In this manner, the SMF may need to update the data in the UDR via the UDM.

The PLMN SMF sends a PDU session establishment accept message to the PLMN AMF.

S508: The PLMN SMF sends the PDU session establishment accept message to the PLMN AMF.

Optionally, the PDU session establishment accept message may include an address of the NPN OSU (for example, an OSU IP address), so that the UE can address and access the NPN OSU to perform an online onboarding procedure and obtain an NPN credential. Optionally, the PDU session establishment accept message may further include a temporary registration indication. The temporary registration indication indicates the UE to deregister with and reselect a network after a period of time (which may be a fixed time period or may be allocated by the network).

S509: The PLMN AMF sends the PDU session establishment accept message to the UE, to establish, for the UE, the PDU session for accessing the NPN.

Optionally, the PDU session establishment accept message includes the address of the NPN OSU and a temporary session indication.

S510: Optionally, the PLMN UDR may trigger a PLMN PCF to perform a UE configuration update procedure for transparent UE policy delivery, to update a URSP on a UE side. The URSP includes a mapping relationship between an NPN application and a DNN and/or NSSAI corresponding to the NPN, so that the UE obtains the DNN and/or the NSSAI corresponding to the NPN when using the NPN application, to establish a PDU session for accessing the NPN DNN. As a result, the UE side completes the update of onboarding information related to a session management policy in a PLMN.

S511: Optionally, the PLMN UDR may trigger the PLMN UDM to perform a UE configuration update procedure for access and mobility management related parameters, to update a mobility restriction policy and/or allowed NSSAI on the UE side. The mobility restriction policy includes a CAG ID corresponding to the NPN. In this way, the UE may select a cell corresponding to the CAG ID for access when accessing the NPN.

Optionally, the allowed NSSAI of the UE is further updated, so that during registration, the UE can provide information for a RAN/the AMF to select a network. As a result, the UE side completes the update of onboarding information related to a mobility management policy in the PLMN.

S512: The UE accesses the NPN OSU by using the established PDU session.

Optionally, the UE finds the NPN OSU based on the OSU address obtained in step S509.

Optionally, the UE finds the NPN OSU based on an OSU address obtained in a method in Embodiment corresponding to FIG. 6. The NPN OSU delivers the NPN credential to the UE, for example, an NPN identity and an NPN authentication credential. The NPN identity is used by the NPN to identify the UE, and the NPN authentication credential is used by the NPN to authenticate the UE (for example, the AAA2 authenticates the UE), and may be a certificate, a symmetric key, or the like. As a result, the UE side completes the update of onboarding information of the NPN.

In S510 to S512, the update of the configuration information of the PLMN and the NPN credential on the UE side is completed. In this way, the UE can complete the update of information about the PLMN and the NPN in a PNI-NPN scenario.

S513: Optionally, the UE reselects, based on the temporary session indication, a network for access.

In an implementation, after receiving the temporary session indication sent in step S509, the UE starts a timer. After the timer expires, the UE enters a deregistration state, and then re-accesses an access network according to the method described in FIG. 3A and FIG. 3B of this application.

Embodiment 1 clarifies how to update the onboarding information of the NPN when the SMF triggers authentication, and provides logic for the UE to re-access a network based on the onboarding information.

Embodiment 2

FIG. 6 shows another specific example of a communication method according to an embodiment of this application. In this embodiment, a control plane network element is an AMF, and the AMF triggers an onboarding delivery authentication procedure (for example, slice authentication). The AMF obtains an authentication success result, and notifies UDM/a UDR to update PLMN onboarding information of UE stored in the UDM/UDR. A specific method includes the following steps.

S600: For a specific description, refer to step S500.

S601: For a specific description, refer to step S501.

S602: The UE sends a first NAS request message to the PLMN AMF, where the first NAS request message includes the OB Info.

Optionally, the first NAS request message further includes an NPN ID. Optionally, the first NAS request message further includes an onboarding request indication. The onboarding request indication indicates the AMF to initiate onboarding delivery authentication, or the first NAS request message indicates the AMF to initiate onboarding delivery authentication. In this embodiment, onboarding delivery authentication may be slice authentication.

S603: The PLMN AMF triggers onboarding delivery authentication based on the OB Info and/or an NPN ID.

Specifically, the PLMN AMF obtains, based on the OB Info and/or the NPN ID, an AAA address corresponding to the OB Info and/or the NPN ID, and triggers onboarding delivery authentication of AAA identified by the AAA address. For example, the PLMN AMF searches for previously configured second subscription data based on the OB Info and/or the NPN ID to obtain the AAA address corresponding to the OB Info and/or the NPN ID.

If two AAA addresses are obtained (for example, AAA1 is used for onboarding delivery authentication, and AAA2 is used for secondary authentication after onboarding is performed), the PLMN AMF may further select, based on the onboarding request indication, to trigger onboarding delivery authentication (onboarding request indication) of AAA identified by the AAA1. In the conventional technology, the PLMN AMF obtains only the AAA2, and therefore directly performs secondary authentication after onboarding is obtained. However, because the AAA1 is introduced in an online onboarding procedure, the PLMN AMF selects, based on the onboarding request indication, to trigger onboarding delivery authentication of the AAA identified by the AAA1.

Optionally, the step may further include: The PLMN AMF determines, based on the OB Info and/or the NPN ID, whether onboarding delivery authentication needs to be performed. Specifically, any one of the following implementations may be used.

In an implementation, the PLMN AMF searches for the second onboarding information based on the OB Info and/or the NPN ID, and finds that the second onboarding information requires to perform onboarding delivery authentication. In this case, the PLMN AMF determines that onboarding delivery authentication needs to be performed.

In another implementation, the PLMN SMF determines, based on the onboarding request indication, that onboarding delivery authentication is needed.

S604: The PLMN AMF initiates onboarding delivery authentication.

Specifically, the PLMN AMF serves as an intermediate node to transit authentication signaling between the UE and the AAA1, to implement two-way authentication between the UE and the AAA1. The authentication signaling may be carried in an EAP protocol, for example, EAP-TLS or EAP-AKA'. Optionally, the UE carries the EAP protocol by using NAS signaling, the NPN AAA carries the EAP protocol by using user plane data, and a communication path may be UE-AMF-AAA proxy (which may be AUSF)-AAA. Onboarding delivery authentication may be slice authentication.

S605: The AMF learns of a result of onboarding delivery authentication, and performs processing based on the result. If authentication succeeds, the PLMN AMF triggers to update an onboarding procedure of the UE.

Specifically, because onboarding delivery authentication is triggered by the AMF, the AMF may obtain, from the AAA1, the result indicating whether onboarding delivery authentication succeeds. If authentication succeeds, the PLMN AMF triggers to update user subscription data of the UE. In other words, the PLMN AMF sends an SUPI and the OB Info and/or the NPN ID to the PLMN UDR. Optionally, the PLMN AMF further sends a GPSI to the PLMN UDR. The GPSI may be generated by the UE and the NPN AAA in an onboarding delivery authentication process, and step S606 continues to be performed. If authentication fails, the PLMN AMF rejects a NAS request of the UE, and the UE cannot access the NPN. Optionally, the UE performs an automatic selection procedure with reference to Embodiment corresponding to FIG. 5.

S606: For a specific description, refer to step S507.

S607: The PLMN AMF sends the UE a first NAS response message, used to reply to the first NAS request message.

Optionally, the first NAS reply message may include an address of an NPN OSU, so that the UE can address and access the NPN OSU for online onboarding. Optionally, a PDU session establishment accept message may further include a temporary registration indication. The temporary registration indication indicates the UE to deregister with and reselect a network after a period of time (which may be a fixed time period or may be allocated by the network). The PDU session establishment accept message includes the address of the NPN OSU and the temporary registration indication.

S608 and S609: For specific descriptions, refer to steps S510 and S511.

S610: The UE initiates a PDU session establishment request to establish a user plane for accessing the NPN.

S611: The UE accesses the NPN OSU by using the established PDU session.

Optionally, the UE finds the NPN OSU based on an OSU IP obtained in step S607, and accesses the NPN OSU. Optionally, the UE finds the NPN OSU based on an OSU address obtained in a method in Embodiment 6. The NPN OSU delivers an NPN credential to the UE, for example, an NPN identity and an NPN authentication credential. The NPN identity is used by the NPN to identify the UE, and the NPN authentication credential is used by the NPN to authenticate the UE (for example, the AAA2 authenticates the UE), and may be a certificate, a symmetric key, or the like. As a result, a UE side completes the update of onboarding information of the NPN.

In steps S608 to S610, the update of configuration information of the PLMN and the NPN credential on the UE side is completed. In this way, the UE can complete the update of information about the PLMN and the NPN in a PNI-NPN scenario.

S611: Optionally, the UE reselects, based on the temporary registration indication, a network for access.

In an implementation, after receiving the temporary registration indication sent in step S609, the UE starts a timer. After the timer expires, the UE enters a deregistration state, and then re-accesses a network according to the conventional technology 2.

FIG. 7 shows a method for obtaining second network information of a private network by a terminal according to an embodiment of this application. In this method, a new core network function path information mapping network element is introduced. The path information mapping network element may be an independent functional entity, or may be a function integrated with a core network element, for example, an AMF, an SMF, or a PCF. A specific method includes the following steps.

S700: Preconfigure mapping information in an MF, where the mapping information may be a mapping relationship between an access network identifier of a private network and second network information of the private network, and the access network identifier of the private network is used by an access network of a public network to identify the private network, and may include a CAG ID and an NPN ID.

S701: The access network broadcasts the access network identifier of the private network.

Optionally, the access network further broadcasts an online onboarding support indication corresponding to the access network identifier of the private network, where the online onboarding support indication indicates that a cell corresponding to the access network identifier supports online onboarding.

S702: The terminal obtains the access network identifier of the private network.

Specifically, that the terminal obtains an access network identifier of one or more private networks from a broadcast message of the access network specifically includes:

The terminal obtains access network identifiers of a plurality of private networks from the broadcast. Optionally, if the access network further broadcasts an online onboarding support indication corresponding to the access network identifier of the private network, the terminal obtains, from the broadcast, only all access network identifiers that are of private networks and that include the online onboarding indication.

The terminal may further display, on a screen of the terminal based on the plurality of access network identifiers in the broadcast, the private networks corresponding to the access network identifiers. Optionally, the terminal selects, from the broadcast, only private networks corresponding to all access network identifiers that include the online onboarding indication. A user performs selection from all the displayed private networks. After the user selects a private network, the terminal obtains an access network identifier of the private network.

S703: The terminal initiates a second NAS request message to the AMF, where the second NAS request message carries the access network identifier of the one or more private networks.

Optionally, the second NAS request message is used to request to obtain second network information of the private network indicated by the access network identifier.

Optionally, the second NAS request message further includes a network information request indication, and the network information request indication is used to request to obtain the second network information of the private network indicated by the access network identifier.

S704: The AMF sends the access network identifier of the one or more private networks to the path information mapping network element. It should be noted that if the path information mapping network element is integrated with the AMF, steps S704 and S706 are skipped.

S705: The path information mapping network element maps second network information of a corresponding private network based on an access network identifier of the private network.

Specifically, the path information mapping network element maps, based on the access network identifier of the private network and the preconfigured mapping relationship, the second network information of the private network corresponding to the access network identifier.

Optionally, if the path information mapping network element obtains a plurality of access network identifiers, the path information mapping network element may form one or more mapping relationships between {the access network identifier of the private network, the second network information of the private network} based on the mapping relationship, which may be, for example, one or more mapping relationships between {NPN ID, DNN, NSSAI, AAA IP, OSU IP}(s).

S706: The path information mapping network element sends the second network information of the private network to the AMF.

Optionally, the path information mapping network element sends the one or more mapping relationships {the access network identifier of the private network, the second network information of the private network} to the AMF.

S707: The AMF sends a second NAS response message to the UE, where the second NAS response message includes the second network information of the private network.

Optionally, the second NAS response message includes the one or more mapping relationships between {the access network identifier of the private network, the second network information of the private network}.

S708: The UE obtains the second network information of the private network.

Optionally, if the UE obtains a plurality of mapping relationships between {the access network identifier of the private network, the second network information of the private network}, the UE obtains second network information of a plurality of private networks.

According to the method described in FIG. 7, the terminal may query the public network by using the access network identifier to obtain the second network information of the private network.

The foregoing mainly describes the solutions provided in this application from a perspective of interaction between network elements. It may be understood that to implement the foregoing functions, each network element includes a corresponding hardware structure and/or software module for implementing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the terminal, the control plane network element, the repository function network element, or another network device may be divided into functional modules based on the foregoing method examples. For example, the functional modules may be divided based on functions, or two or more functions may be integrated into one processing module. The integrated module may be implemented in a form of hardware, or may be implemented in a form of a software functional module. It should be noted that, in embodiments of this application, module division is merely an example, and is merely a logical function division. In actual implementation, another division manner may be used.

Figure 8:
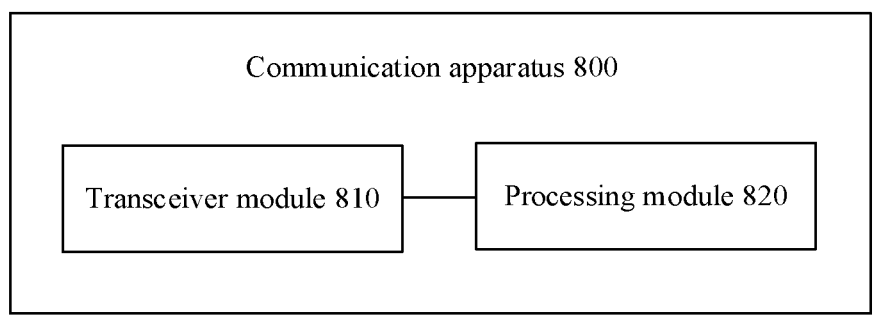
FIG. 8 is a schematic diagram of a communication apparatus according to this application.

When an integrated unit is used, FIG. 8 is a schematic diagram of a structure of a communication apparatus according to an embodiment of this application. The communication apparatus 800 includes a transceiver module 810 and a processing module 820. The communication apparatus may be configured to implement the control plane network element or the repository function network element in any one of the foregoing method embodiments, or configured to implement a function of the network element in any one of the foregoing method embodiments. For example, the communication apparatus may be an AMF network element or an SMF network element in a core network, or may be a UDR network element or a UDM network element, or may be a PCF network element, an AAA network element, an OSU server network element, or an MF network element. The network element or network function may be a network element in a hardware device, may be a software function running on dedicated hardware, or may be a virtualized function instantiated on a platform (for example, a cloud platform).

(1) In an example, when the communication apparatus serves as a terminal or a chip applied to the terminal, and performs the steps performed by the terminal in the foregoing method embodiments, the transceiver module 810 may be configured to support the communication apparatus 80o in performing communication, for example, performing sending and/or receiving actions performed by the terminal in FIG. 4A and FIG. 4B and FIG. 7, or sending and/or receiving actions performed by the UE in FIG. 5 and FIG. 6. The processing module 820 may be configured to support the communication apparatus 80o in performing the processing actions in the foregoing method embodiments, for example, performing the processing actions performed by the terminal in FIG. 4A and FIG. 4B and FIG. 7, or the processing actions performed by the UE in FIG. 5 and FIG. 6. Optionally, the first communication apparatus 80o may further include a storage module 830 (not shown in FIG. 8), configured to store program code and data of the first communication apparatus. In a possible implementation, details are as follows:

The transceiver module is configured to send first network information of a second network to a first network, where the first network information includes first indication information of the second network, and the first indication information indicates that a terminal requests to access the second network.

The processing module is configured to use the transceiver module to perform onboarding delivery authentication of the second network through the first network.

After onboarding delivery authentication of the second network succeeds, the processing module is configured to use the transceiver module to receive configuration information of the first network through the first network, and obtain a credential of the second network through the first network from an online sign-up server in the second network.

Optionally, the first network information may further include an onboarding request indication, indicating a control plane network element in the first network to initiate onboarding delivery authentication.

Optionally, the processing module is further configured to use the transceiver module to obtain second network information of the second network from a broadcast message of an access network, and obtain the first network information based on the second network information;

the processing module is further configured to use the transceiver module to obtain a network identifier of the second network from a broadcast message of an access network, obtain second network information of the second network from a path information mapping network element based on the network identifier of the second network, and obtain the first network information based on the second network information; or the processing module is further configured to use the transceiver module to obtain second network information of the second network from an application server in the second network, and obtain the first network information based on the second network information.

Optionally, the processing module is further configured to use the transceiver module to access the second network based on the configuration information of the first network and the credential of the second network.

Optionally, the processing module is further configured to use the transceiver module to receive a temporary indication returned by the first network, and start a timer based on the temporary indication.

After the timer expires, the processing module is further configured to perform using the transceiver module to access the second network based on the obtained configuration information of the first network and the obtained credential of the second network.

Optionally, the configuration information of the first network includes an access and mobility management related parameter and a session management policy, and the access and mobility management related parameter and the session management policy are obtained by the first network based on first onboarding information of the second network.

Optionally, the processing module is configured to: obtain an address of the online sign-up server, and obtain the credential of the second network from the online sign-up server based on a first session and the address of the online sign-up server, where the first session is a session established between the terminal and the first network.

Optionally, the processing module is specifically configured to obtain the address of the online sign-up server from the second network information; or the processing module is specifically configured to use the transceiver module to receive the address of the online sign-up server returned by the first network.

(2) In an example, when the communication apparatus serves as a control plane network element or a chip applied to the control plane network element, and performs the steps performed by the control plane network element in the foregoing method embodiments, the transceiver module 810 may be configured to support the communication apparatus 800 in performing communication, for example, performing sending and/or receiving actions performed by the control plane network element in FIG. 4A and FIG. 4B, sending and/or receiving actions performed by the SMF in FIG. 5, or sending and/or receiving actions performed by the AMF in FIG. 6 and FIG. 7. The processing module 820 may be configured to support the communication apparatus 80o in performing the processing actions in the foregoing method embodiments, for example, performing the processing actions performed by the control plane network element in FIG. 4A and FIG. 4B, the processing actions performed by the SMF in FIG. 5, or the processing actions performed by the AMF in FIG. 6 and FIG. 7. Optionally, the first communication apparatus 80o may further include a storage module 830 (not shown in FIG. 8), configured to store program code and data of the first communication apparatus. In a possible implementation, details are as follows:

The transceiver module is configured to receive first network information of a terminal, where the first network information includes first indication information of a second network, and the first indication information indicates that the terminal requests to access the second network.

The processing module is configured to: determine, based on the first network information of the terminal, that onboarding delivery authentication of the second network needs to be performed on the terminal, and trigger onboarding delivery authentication of the second network.

After onboarding delivery authentication of the second network succeeds, the transceiver module is configured to send a repository function network element in the first network a third message, used to trigger the repository function network element to update user subscription data of the terminal, where the message includes a terminal identifier and second indication information of the second network.

Optionally, the transceiver module is configured to send a second message to the terminal, where the second message includes one or more of a temporary indication and an address of an online sign-up server.

Optionally, the second indication information is obtained by the control plane network element based on the first indication information.

Optionally, the second indication information is the same as the first indication information.

Optionally, the processing module is further configured to obtain an address of an online sign-up authentication device based on the first indication information of the second network. The transceiver module is further configured to send the online sign-up authentication device a first message, used to trigger onboarding delivery authentication of the second network.

Optionally, the processing module is further configured to obtain, based on the first indication information of the second network, the address of the online sign-up server corresponding to the second network.

Optionally, the processing module is specifically configured to: search for second onboarding information of the second network based on the first network information, and determine, based on the second onboarding information of the second network, that onboarding delivery authentication of the second network needs to be performed on the terminal; or determine, based on an onboarding request indication included in the first network information, that onboarding delivery authentication of the second network needs to be performed on the terminal.

(3) In an example, when the communication apparatus serves as a repository function network element or a chip applied to the repository function network element, and performs the steps performed by the repository function network element in the foregoing method embodiments, the transceiver module 810 may be configured to support the communication apparatus 800 in performing communication, for example, performing sending and/or receiving actions performed by the repository function network element in FIG. 4A and FIG. 4B, sending and/or receiving actions performed by the UDM or the UDR in FIG. 5, or sending and/or receiving actions performed by the UDM or the UDR in FIG. 6. The processing module 820 may be configured to support the communication apparatus 800 in performing the processing actions in the foregoing method embodiments, for example, performing the processing actions performed by the repository function network element in FIG. 4A and FIG. 4B, the processing actions performed by the UDM or the UDR in FIG. 5, or the processing actions performed by the UDM or the UDR in FIG. 6. Optionally, the first communication apparatus 800 may further include a storage module 830 (not shown in FIG. 8), configured to store program code and data of the first communication apparatus. In a possible implementation, details are as follows:

The transceiver module is configured to receive, from a control plane network element in a first network, a third message, used to trigger to update user subscription data of a terminal in the first network, where the third message carries a terminal identifier and second indication information of a second network.

The processing module is configured to obtain, based on the second indication information of the second network, first subscription data corresponding to the second network.

The processing module is configured to update the user subscription data of the terminal based on the first subscription data of the second network.

Optionally, the processing module is configured to use the transceiver module to update configuration information on the terminal.

Optionally, the processing module is specifically configured to use the transceiver module to send a subscription data change notification to a policy control network element, to trigger the policy control network element to update the session management policy that is on the terminal.

Optionally, the configuration information includes an access and mobility management related parameter, and the processing module is specifically configured to obtain the access and mobility management related parameter based on first onboarding information of the second network, and use the transceiver module to send the access and mobility management related parameter to the terminal.

Optionally, the first subscription data of the second network includes a data network name DNN.

Optionally, the first subscription data of the second network may further include one or more of network slice selection assistance information NSSAI, a closed access group identifier CAG ID, a slice identifier privacy indication, a secondary authentication execution indication, a slice authentication execution indication, and a user plane protection policy.

Figure 9:
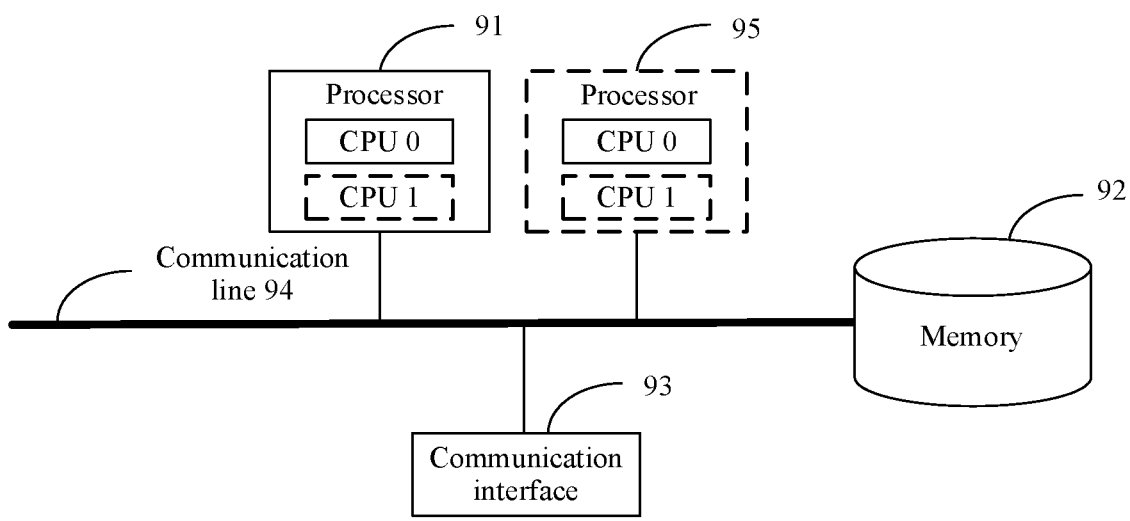
FIG. 9 is a schematic diagram of a communication apparatus according to this application.

When the processing module 820 is a processor, the transceiver module 810 is a communication interface, and the storage module 830 is a memory, the communication apparatus 800 in this embodiment of this application may be a communication apparatus 900 shown in FIG. 9.

FIG. 9 is a schematic diagram of a hardware structure of a communication apparatus according to an embodiment of this application. For structures of a control plane network element and a repository function network element, refer to the structure shown in FIG. 9. The communication apparatus includes a processor 91, a communication line 94, and at least one communication interface (where FIG. 9 is described merely by using an example in which the communication apparatus includes a communication interface 93).

Optionally, the communication device may further include a memory 92.

The processor 91 may be a general-purpose central processing unit (CPU), a microprocessor, an application-specific integrated circuit (ASIC), or one or more integrated circuits configured to control program execution in the solutions of this application.

The communication line 94 may include a path for transmitting information between the foregoing components.

The communication interface 93 that uses any apparatus such as a transceiver is configured to communicate with another device or a communication network, for example, Ethernet, a radio access network (RAN), or a wireless local area network (WLAN).

The memory 92 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in an instruction or data structure form and that can be accessed by a computer. However, this is not limited herein. The memory may exist independently, and is connected to the processor through the communication line 94. The memory may alternatively be integrated with the processor.

The memory 92 is configured to store computer-executable instructions for executing the solutions of this application, and the processor 91 controls the execution. The processor 91 is configured to execute the computer-executable instructions stored in the memory 92, to implement a communication method provided in the following embodiments of this application.

Optionally, the computer-executable instructions in this embodiment of this application may also be referred to as application program code. This is not specifically limited in this embodiment of this application.

During specific implementation, in an embodiment, the processor 91 may include one or more CPUs, for example, a CPU 0 and a CPU 1 in FIG. 9.

During specific implementation, in an embodiment, the communication device may include a plurality of processors, for example, the processor 91 and a processor 95 in FIG. 9. Each of the processors may be a single-core (single-CPU) processor or a multi-core (multi-CPU) processor. The processors herein may be one or more devices, circuits, and/or processing cores for processing data (for example, computer program instructions).

In embodiments of this application, a specific structure of a body for performing a communication method is not specially limited in embodiments of this application, provided that the body can run a program that records code of the communication method in embodiments of this application, to perform communication according to the communication method in embodiments of this application. This is not limited in this application.

It should be noted that reference may be made to each other for embodiments of this application. For example, for same or similar steps, mutual reference may be made between the method embodiment and the apparatus embodiment. This is not limited.

Figure 10:
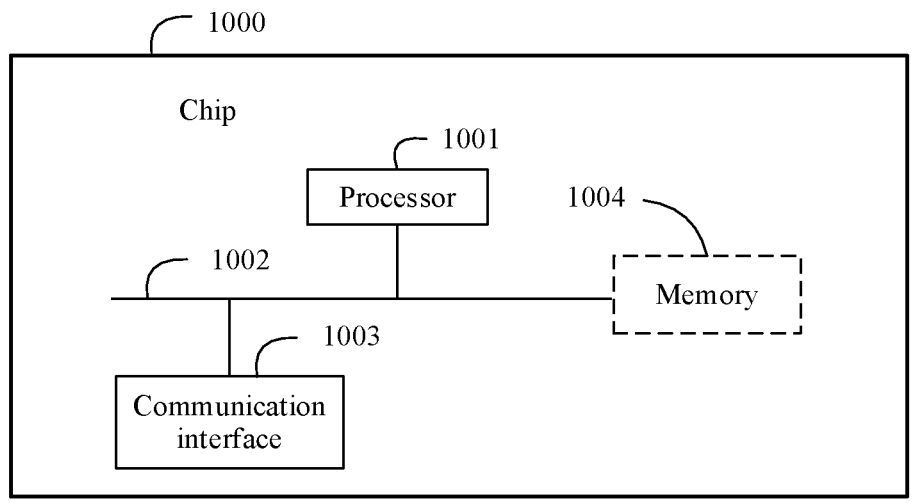
FIG. 10 is a schematic diagram of a chip according to this application.

FIG. 10 is a schematic diagram of a structure of a chip 1000 according to an embodiment of this application. The chip 10 includes one or more (including two) processors 1001 and a communication interface 1003.

Optionally, the chip 1000 further includes a memory 1004. The memory 1004 may include a read-only memory and a random access memory, and provide operation instructions and data for the processor 1001. A part of the memory 1004 may further include a non-volatile random access memory (NVRAM).

In some implementations, the memory 1004 stores the following elements: an execution module or a data structure, a subset thereof, or an extended set thereof.

In this embodiment of this application, a corresponding operation is executed by invoking the operation instructions (where the operation instructions may be stored in an operating system) stored in the memory 1004.

In a possible implementation, structures of a control plane network element, a repository function network element, and a chip used by a terminal are similar, and different apparatuses may implement respective functions by using different chips.

The processor 1001 controls a processing operation of any one of the control plane network element, the repository function network element, and the terminal. The processor 1001 may also be referred to as a central processing unit (CPU).

The memory 1004 may include a read-only memory and a random access memory, and provide instructions and data for the processor 1001. A part of the memory 1004 may further include an NVRAM. For example, during application, the memory 1004, the communication interface 1003, and the memory 1004 are coupled together by using a bus system 1002, and in addition to a data bus, the bus system 1002 may further include a power supply bus, a control bus, a state signal bus, and the like. However, for clarity of description, various buses are denoted as the bus system 1002 in FIG. 10.

The methods disclosed in the foregoing embodiments of this application may be applied to the processor 1001 or implemented by the processor 1001. The processor 1001 may be an integrated circuit chip and has a signal processing capability. In an implementation process, each step in the foregoing method may be completed by using an integrated logic circuit of hardware in the processor 1001 or an instruction in a form of software. The processor 1001 may be a general-purpose processor, a digital signal processor (DSP), an ASIC, a field programmable gate array (FPGA) or another programmable logic device, a discrete gate or a transistor logic device, or a discrete hardware component. The methods, the steps, and logic block diagrams that are disclosed in embodiments of this application may be implemented or performed. The general-purpose processor may be a microprocessor, or the processor may be any conventional processor or the like. The steps of the methods disclosed with reference to embodiments of this application may be directly presented as being performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory 1004, and the processor 1001 reads information in the memory 1004 and completes the steps in the foregoing method in combination with hardware of the processor.

In a possible implementation, the communication interface 1030 is configured to perform receiving and sending steps of corresponding network elements in embodiments shown in FIG. 2 and FIG. 3A and FIG. 3B. The processor

1001 is configured to perform processing steps of corresponding network elements in embodiments shown in FIG. 2 and FIG. 3A and FIG. 3B.

The communication unit may be a communication interface of the apparatus, and is configured to receive a signal from another apparatus. For example, when the apparatus is implemented as a chip, the communication unit is a communication interface used by the chip to receive a signal from another chip or apparatus or send a signal to another chip or apparatus, for example, a pin of the chip.

Figure 11:
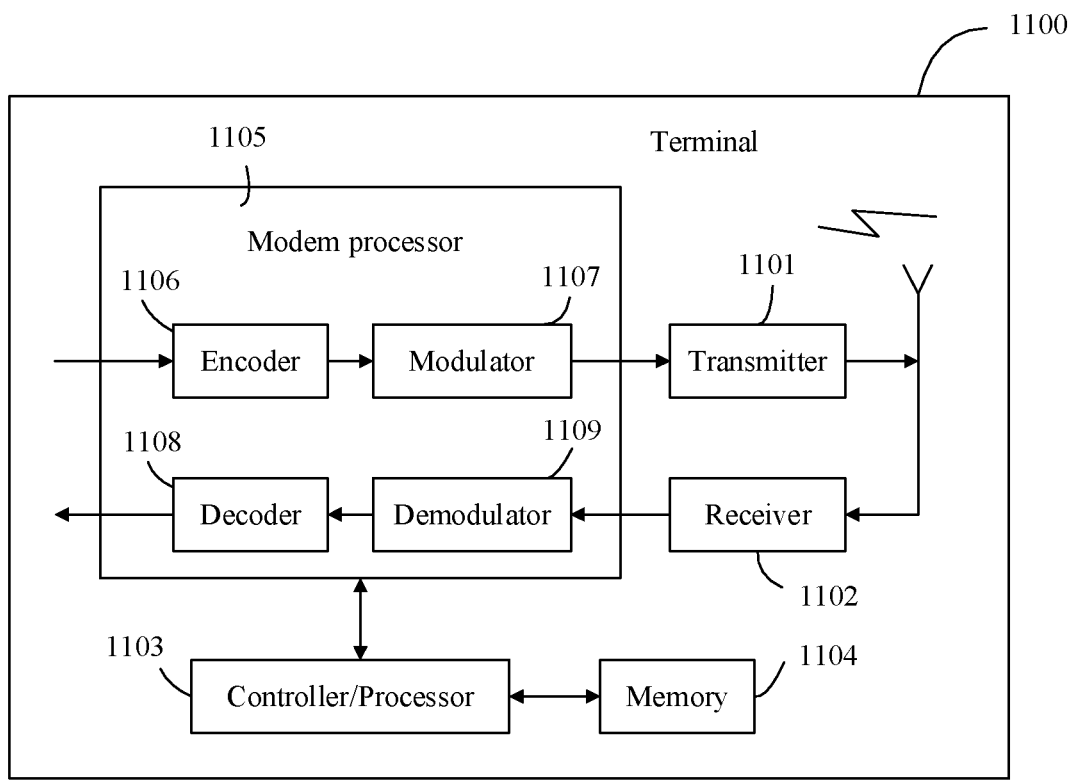
FIG. 11 is a schematic diagram of a terminal according to this application.

FIG. 11 is a simplified schematic diagram of a possible design structure of a terminal according to an embodiment of this application. The terminal 1100 includes a transmitter 1101, a receiver 1102, and a processor 1103. The processor 1103 may also be a controller, and is indicated as a "controller/processor 1103" in FIG. 11. Optionally, the terminal 1100 may further include a modem processor 1105. The modem processor 1105 may include an encoder 1106, a modulator 11011, a decoder 1108, and a demodulator 1109.

In an example, the transmitter 1101 adjusts (for example, through analog conversion, filtering, amplification, and up-conversion) output sampling and generates an uplink signal, and the uplink signal is transmitted to the DNS and the P-CSCF in the foregoing embodiment by using an antenna. In a downlink, a downlink signal is received by using the antenna. The receiver 1102 adjusts (for example, through filtering, amplification, down-conversion, and digitization) a signal received from the antenna and provides an input sample. In the modem processor 1105, the encoder 1106 receives service data and a signaling message that are to be sent on an uplink, and processes (for example, formats, encodes, and interleaves) the service data and the signaling message. The modulator 11011 further processes (for example, performs symbol mapping and modulation on) encoded service data and an encoded signaling message, and provides an output sample. The demodulator 1109 processes (for example, demodulates) the input sample and provides symbol estimation. The decoder 1108 processes (for example, de-interleaves and decodes) the symbol estimation and provides the decoded data and signaling message that are to be sent to the terminal 1100. The encoder 1106, the modulator 11011, the demodulator 1109, and the decoder 1108 may be implemented by the combined modem processor 1105. The units perform processing based on a radio access technology (for example, an access technology of an LTE or another evolution system) used by a radio access network. It should be noted that when the terminal 1100 does not include the modem processor 1105, the foregoing functions of the modem processor 1105 may be implemented by the processor 1103.

The processor 1103 controls and manages an action of the terminal 1100, and is configured to perform processing processes performed by the terminal 1100 in the foregoing embodiments of this application. For example, the terminal 1103 is further configured to perform the processing processes of the terminal or the UE in the method shown in FIG. 4A and FIG. 4B, FIG. 5, FIG. 6, FIG. 7, and FIG. 4A and FIG. 4B and/or another process of the technical solutions described in this application.

Further, the terminal 1100 may include a memory 1104, and the memory 1104 is configured to store program code and data of the terminal 1100.

An embodiment of this application further provides a computer-readable storage medium. The computer storage medium stores computer-readable instructions. When a computer reads and executes the computer-readable instructions, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communication system. The communication system includes a control plane network element and a repository function network element. Optionally, the communication system may further include another network device and/or terminal.

It should be understood that, the processor mentioned in embodiments of this application may be a central processing unit (CPU), the processor may further be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be further understood that the memory mentioned in embodiments of this application may be a volatile memory or a nonvolatile memory, or may include a volatile memory and a non-volatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of the present invention.

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in embodiments of this application. The foregoing storage medium includes various media that can store program code, for example, a USB flash drive, a removable hard disk, a read-only memory (ROM), a random access memory (RAM), a magnetic disk, and an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A method, comprising:
accessing, by a communication apparatus, a public network;
sending, by the communication apparatus, onboarding information to a session management function network element via an access and mobility management function network element,
wherein the onboarding information is used to establish a communication path for accessing a non public data network after the communication apparatus accessing the public network,
wherein in which an online sign-up server is located in the non public data network, and
wherein the session management function network element and the access and mobility management function network element are located in the public network different from the non public data network in which the online sign-up server is located,
receiving, by the communication apparatus, a protocol data unit session establishment accept message via the access and mobility management function network element, wherein the protocol data unit session establishment accept message comprises an address of the online sign-up server; and
obtaining, by the communication apparatus, a non public network credential from the online sign-up server based on the address of the online sign-up server.

2. The method according to claim 1, further comprising:
before the receiving the protocol data unit session establishment accept message,
performing, by the communication apparatus, an onboarding delivery authentication with an authentication server via the session management function network element.

3. The method according to claim 2, wherein the performing the onboarding delivery authentication with the authentication server comprises:
performing a secondary authentication with an Authentication, Authorization, and Accounting (AAA) server via the session management function network element.

4. The method according to claim 1, wherein the onboarding information comprises a data network name of the non public data network.

5. The method according to claim 1, wherein the non public network credential comprises a non public network identity and a non public network authentication credential, wherein the non public network identity is used by the non public data network to identify the communication apparatus, and the non public network authentication credential is used by the non public data network to authenticate the communication apparatus.

6. A method, comprising:
receiving, by a session management function network element via an access and mobility management function network element, onboarding information from a user equipment (UE) communication apparatus,
wherein the onboarding information is used to establish a communication path for accessing a non public data network after the communication apparatus accesses a public network,
wherein an online sign-up server is located in the non public data network, and
wherein the session management function network element and the access and mobility management function network element are located in a first the public network different from the non public data network in which the online sign-up server is located,
triggering, by the session management function network element, an onboarding delivery authentication based on the onboarding information; and sending, by session management function network element via the access and mobility management function network element, a protocol data unit session establishment accept message to the communication apparatus after the onboarding delivery authentication is successful, wherein the protocol data unit session establishment accept message comprises an address of the online sign-up server.

7. The method according to claim 6, wherein, the method comprises:
after the onboarding delivery authentication is successful:
sending, by the session management function network element, a first message to a repository function network element, wherein the first message is used to trigger the repository function network element to update user onboarding information of the communication apparatus.

8. The method according to claim 6, wherein the onboarding information comprises a data network name of the non public data network.

9. The method according to claim 6, wherein the onboarding delivery authentication is a secondary authentication.

10. A communication apparatus, comprising:
at least one processor; and
a non-transitory computer readable storage medium storing programming, the programming including instructions that, when executed by the at least one processor, cause the communication apparatus to perform operations, the operations including:
accessing a public network;
sending onboarding information to a session management function network element via an access and mobility management function network element,
wherein the onboarding information is used to establish a communication path for accessing a non public data network after the communication apparatus accessing the public network,
wherein an online sign-up server is located in the non public data network, and
wherein the session management function network element and the access and mobility management function network element are located in a first the public network different from the non public data network in which the online sign-up server is located,
receiving a protocol data unit session establishment accept message via the access and mobility management function network element, wherein the protocol data unit session establishment accept message comprises an address of the online sign-up server; and
obtaining a non public network credential from the online sign-up server based on the address of the online sign-up server.

11. The communication apparatus according to claim 10, the operations further comprising:
performing an onboarding delivery authentication with an authentication server via the session management function network element before receiving the protocol data unit session establishment accept message.

12. The communication apparatus according to claim 10, wherein the onboarding information comprises a data network name of the non public data network.

13. The communication apparatus according to claim 10, wherein the non public network credential comprises a non public network identity and a non public network authentication credential, wherein the non public network identity is used by the non public data network to identify the communication apparatus, and the non public network authentication credential is used by the non public data network to authenticate the communication apparatus.

14. A communication apparatus, comprising:
at least one processor; and
a non-transitory computer readable storage medium storing programming, the programming including instructions that, when executed by the at least one processor, cause the communication apparatus to perform operations, the operations including:
receiving onboarding information from a user equipment (UE) via an access and mobility management function network element,
wherein the onboarding information is used to establish a communication path for accessing a non public data network after the UE accesses a public network,
wherein an online sign-up server is located in the non public data network, and
wherein the access and mobility management function network element is located in the public network different from the non public data network in which the online sign-up server is located,
triggering an onboarding delivery authentication based on the onboarding information; and
sending a protocol data unit session establishment accept message to the UE via the access and mobility management function network element, after the onboarding delivery authentication is successful, wherein the protocol data unit session establishment accept message comprises an address of the online sign-up server.

15. The method of claim 1, wherein the session management function network element in the public network obtains the address of the online sign-up server based on the onboarding information from the communication apparatus and sets the address of the online sign-up server in the protocol data unit session establishment accept message.

16. The method of claim 1, further comprising:
after the obtaining the non public network credential from the online sign-up server:
receiving, by the communication apparatus, configuration information of the public network through the public network, wherein the configuration information includes at least one of an access and mobility management related parameter and a session management policy; and
accessing, by the communication apparatus, the non public data network using the non public network credential and the configuration information of the public network.

17. The method of claim 1, further comprising:
before sending the onboarding information:
obtaining, by the communication apparatus, second network information of the non public data network from a broadcast message of an access network or from an application server; and
selecting, by the communication apparatus, the non public data network from a plurality of available non public data networks based on the second network information,
wherein the onboarding information is determined based on the second network information of the non public data network.

* * * * *

UNITED STATES PATENT AND TRADEMARK OFFICE
CERTIFICATE OF CORRECTION

Page 1 of 1

PATENT NO. : 12,477,329 B2
APPLICATION NO. : 17/852858
DATED : November 18, 2025
INVENTOR(S) : Hu et al.

It is certified that error appears in the above-identified patent and that said Letters Patent is hereby corrected as shown below:

In the Claims

In Column 44, in Claim 1, Line 9, after "wherein" delete "in which".

In Column 44, in Claim 1, Line 15, delete "located," and insert -- located; --.

In Column 44, in Claim 6, Line 53, before "communication" delete "user equipment (UE)".

In Column 44, in Claim 6, Line 62, after "located in" delete "a first".

In Column 44, in Claim 6, Line 64, delete "located," and insert -- located; --.

In Column 45, in Claim 10, Line 42, after "located in" delete "a first".

In Column 45, in Claim 10, Line 44, delete "located," and insert -- located; --.

In Column 46, in Claim 14, Line 23, delete "located," and insert -- located; --.

Signed and Sealed this
Thirtieth Day of December, 2025

John A. Squires
*Director of the United States Patent and Trademark Office*